United States Patent
Gorelchenko et al.

(10) Patent No.: US 11,852,560 B2
(45) Date of Patent: Dec. 26, 2023

(54) DEVICES WITH LIQUID LENSES AND TEST METHODS AND ASSEMBLIES FOR TESTING DEVICES WITH LIQUID LENSES

(71) Applicant: CORNING INCORPORATED, Corning, NY (US)

(72) Inventors: Petr Gorelchenko, Painted Post, NY (US); Raymond Miller Karam, Santa Barbara, CA (US); Jonathan David Pesansky, Corning, NY (US); Michael David Shorkey, Corning, NY (US); Ming Ying, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 405 days.

(21) Appl. No.: 17/056,975

(22) PCT Filed: May 22, 2019

(86) PCT No.: PCT/US2019/033539
§ 371 (c)(1),
(2) Date: Nov. 19, 2020

(87) PCT Pub. No.: WO2019/226778
PCT Pub. Date: Nov. 28, 2019

(65) Prior Publication Data
US 2021/0364384 A1 Nov. 25, 2021

Related U.S. Application Data

(60) Provisional application No. 62/674,748, filed on May 22, 2018.

(51) Int. Cl.
*G01M 7/08* (2006.01)
*G01M 11/08* (2006.01)
(Continued)

(52) U.S. Cl.
CPC .............. *G01M 11/08* (2013.01); *G01M 7/08* (2013.01); *G02B 3/12* (2013.01); *H04N 23/55* (2023.01)

(58) Field of Classification Search
USPC .......................................................... 73/12.01
See application file for complete search history.

(56) References Cited

U.S. PATENT DOCUMENTS 4,030,813 A * 6/1977 Kohashi ............... G02B 26/004
359/245
6,462,884 B2 * 10/2002 Hung ............... B29D 11/00528
359/620

(Continued)

FOREIGN PATENT DOCUMENTS

WO  WO-2007091771 A1 *  8/2007  ........... G02B 26/005
WO  2018/048183 A1  3/2018

OTHER PUBLICATIONS

International Search Report and Written Opinion of the International Searching Authority; PCT/US2019/033539; dated Aug. 20, 2019; 12 Pages; European Patent Office.

*Primary Examiner* — Clayton E. LaBalle
*Assistant Examiner* — Warren K Fenwick

(57) ABSTRACT

In a first aspect, a testing assembly for conducting reliability tests on liquid lenses includes a liquid lens, and a test frame arranged to receive the liquid lens. The liquid lens includes a lens body defining a cavity, a first liquid disposed within the cavity, and a second liquid disposed within the cavity that is substantially immiscible with the first liquid such that an interface between the first liquid and the second liquid forms a lens. The test frame includes a front wall, and a back wall oriented substantially parallel to the front wall. The liquid lens mounts to at least one of the front wall or the back wall and the test frame simulates a smart device incorporating a liquid lens.

18 Claims, 19 Drawing Sheets

(51) Int. Cl.
    *G02B 3/12*     (2006.01)
    *H04N 23/55*    (2023.01)

(56) References Cited

U.S. PATENT DOCUMENTS

| | | | |
|---|---|---|---|
| 7,126,903 B2 * | 10/2006 | Feenstra | G02B 26/005 |
| 7,672,059 B2 * | 3/2010 | Batchko | F03G 7/005 |
| | | | 359/666 |
| 8,292,798 B2 * | 10/2012 | Californiaa | C12M 25/00 |
| | | | 600/33 |
| 8,729,515 B2 * | 5/2014 | Hirsa | B29D 11/00461 |
| | | | 250/573 |
| 9,201,174 B2 | 12/2015 | Karam et al. | |
| 9,244,203 B2 * | 1/2016 | Otts | G02C 7/022 |
| 9,902,648 B2 | 2/2018 | Amin et al. | |
| 9,952,358 B2 | 4/2018 | Karam et al. | |
| 10,635,137 B2 * | 4/2020 | Park | G06F 1/1641 |
| 2006/0215274 A1 | 9/2006 | Renders et al. | |
| 2015/0030834 A1 | 1/2015 | Morey et al. | |
| 2016/0260206 A1 | 9/2016 | Jung et al. | |
| 2016/0286671 A1 | 9/2016 | Ahmed et al. | |
| 2017/0315274 A1 | 11/2017 | Park et al. | |
| 2017/0341973 A1 | 11/2017 | Gross et al. | |
| 2019/0072469 A1 | 3/2019 | Chambliss et al. | |

\* cited by examiner

DEVICES WITH LIQUID LENSES AND TEST METHODS AND ASSEMBLIES FOR TESTING DEVICES WITH LIQUID LENSES

CROSS-REFERENCE TO RELATED APPLICATIONS

The present application claims the benefit of priority under 35 U.S.C. § 371 of International Application No. PCT/US2019/033539, filed on May 22, 2019, which claims the benefit of U.S. Provisional Patent Application No. 62/674,748, entitled "Devices with Liquid Lenses and Test Methods and Testing Devices with Liquid Lenses," Filed May 22, 2018, hereby incorporated by reference in its entirety.

TECHNICAL FIELD

The present specification generally relates to liquid lenses and, more specifically, to devices with liquid lenses and test methods and assemblies for testing liquid lenses in simulated impact situations.

BACKGROUND

If a mixture of two liquids, neither of which are miscible or soluble in the other, is vigorously stirred or shaken, an emulsion—defined as a fine dispersion of minute droplets of one of the liquids in the other—may form. A transmissive liquid lens includes a housing comprising two immiscible fluids, one polar and one non-polar, each characterized by a different index of refraction. The housing incorporates electrodes by which the shape of the liquid lens, and therefore its optical power, may be manipulated based on the principles of electrowetting. If such a lens is subjected to impact or shock, for example due to the impact of the lens or a device including the lens being dropped, large accelerations may cause the liquids to emulsify and/or the housing may fracture leading to the liquids leaking from the liquid lens. Both cases negatively impact the optical performance of the lens, and are thus undesirable. Testing of the liquid lens through simulated drops may provide useful insight into the reliability/resistance to impact of the liquid lens.

Accordingly, a need exists for testing methods and assemblies for testing liquid lenses.

SUMMARY

In a first aspect, a testing assembly for conducting reliability tests on liquid lenses includes a liquid lens, and a test frame arranged to receive the liquid lens. The liquid lens includes a lens body defining a cavity, a first liquid disposed within the cavity, and a second liquid disposed within the cavity that is substantially immiscible with the first liquid such that an interface between the first liquid and the second liquid forms a lens. The test frame includes a front wall, and a back wall oriented substantially parallel to the front wall. The liquid lens mounts to at least one of the front wall or the back wall and the test frame simulates a smart device incorporating a liquid lens.

In a second aspect according to the first aspect, wherein the testing assembly comprises a test stand arranged to facilitate performance of an impact test comprising a drop test, a pendulum test, or a ball drop test.

In a third aspect according to the second aspect, wherein the test frame is arranged to be mounted to the test stand.

In a fourth aspect according to the second aspect or the third aspect, wherein the test stand comprises jaws arranged assemble the test frame to the test stand.

In a fifth aspect according to the fourth aspect, wherein the jaws are adjustable relative to a horizontal axis to adjust a drop angle of the test frame.

In a sixth aspect according to any preceding aspect, further including an impact surface, wherein the test frame impacts the impact surface during a reliability test.

In a seventh aspect according to any preceding aspect, wherein the liquid lens is mounted within a camera module.

In an eighth aspect a method for conducting reliability tests on liquid lenses, includes mounting a liquid lens within a test frame, the test frame comprising a front wall, a back wall oriented substantially parallel to the front wall, wherein the test frame simulates a smart device incorporating a liquid lens, and performing an impact test comprising at least one of a drop test, a pendulum test, or a ball drop test on the liquid lens and the test frame.

In a ninth aspect according to the eighth aspect, wherein performing the impact test includes mounting the test frame to a test stand, positioning the test frame at a predetermined height with the test stand, and dropping the test frame with the liquid lens mounted therein from the predetermined height.

In a tenth aspect according to the eighth aspect or the ninth aspect, further including comprising adjusting a drop angle of the test frame with the test stand.

In an eleventh aspect according to any of the eighth through the tenth aspect, further including applying a bending moment to the test frame, wherein the bending moment is maintained throughout the impact test.

In a twelfth aspect according to any of the eighth through the eleventh aspect, further including comprising determining a reliability of the liquid lens by one of: detecting emulsification of the liquid lens, detecting a fracture of the liquid lens, determining a change in optical performance of the liquid lens, or any combinations thereof.

In a thirteenth aspect according to the twelfth aspect, wherein determining the change in optical performance of the liquid lens includes energizing the liquid lens to a known diopter voltage, and comparing a shape of the liquid lens to a pre-dropped shape of the liquid lens energized to the same known diopter voltage.

In a fourteenth aspect, a liquid lens includes a lens body defining a cavity, a first liquid disposed within the cavity, and a second liquid disposed within the cavity that is substantially immiscible with the first liquid such that an interface between the first liquid and the second liquid forms a lens, wherein the liquid lens comprises a survivability rate of at least 60% as determined with a drop test, a pendulum test, or a ball drop test.

In a fifteenth aspect according to the fourteenth aspect, wherein the survivability rate is at least 90% using the drop test.

In a sixteenth aspect according to the fourteenth aspect of the fifteenth aspect, wherein the liquid lens comprises a change in optical performance of less than 1% after application of the drop test.

In a seventeenth aspect according to any of the fourteenth through the sixteenth aspect, wherein the lens body is arranged to be assembled in a camera module.

In an eighteenth aspect according to any of the fourteenth through the seventeenth aspect wherein the cavity includes a headspace, and a base portion defined by a bore, wherein the second liquid is disposed in the base portion and the first liquid is disposed in the headspace.

In a nineteenth aspect according to any of the fourteenth through the eighteenth aspect, further including a first outer layer defining a first window, an intermediate layer defining the cavity, and a second outer layer defining a second window, wherein the intermediate layer is positioned between the first outer layer and the second outer layer.

In a twentieth aspect according to any of the fourteenth through the eighteenth aspect, wherein the first liquid and the second liquid comprise substantially the same density.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Liquid lenses may be used to replace mechanical lenses in various applications. For example, liquid lenses may replace either the front or rear camera lenses often included on today's smart devices (e.g., smartphones, tablets, and the like). Embodiments described herein relate to liquid lenses, camera modules incorporating a liquid lens, and reliability testing of the liquid lenses and/or camera modules in simulated situations indicative of real world wear and tear on smart devices and the liquid lenses contained therein. As will be described in greater detail herein, the liquid lens either on its own, or incorporated into a camera module, may be mounted to a test frame that is capable of simulating force transfers that may be experienced by a liquid lens incorporated into an actual smart device. Accordingly, the present testing device may save time and money as the liquid lens need not be incorporated into an actual smart device to test the reliability of the liquid lens in real world settings. Various embodiments of liquid lenses and testing apparatuses and methodologies for testing liquid lenses will be described in more detail herein with specific reference to the appended drawings.

Figure 1:
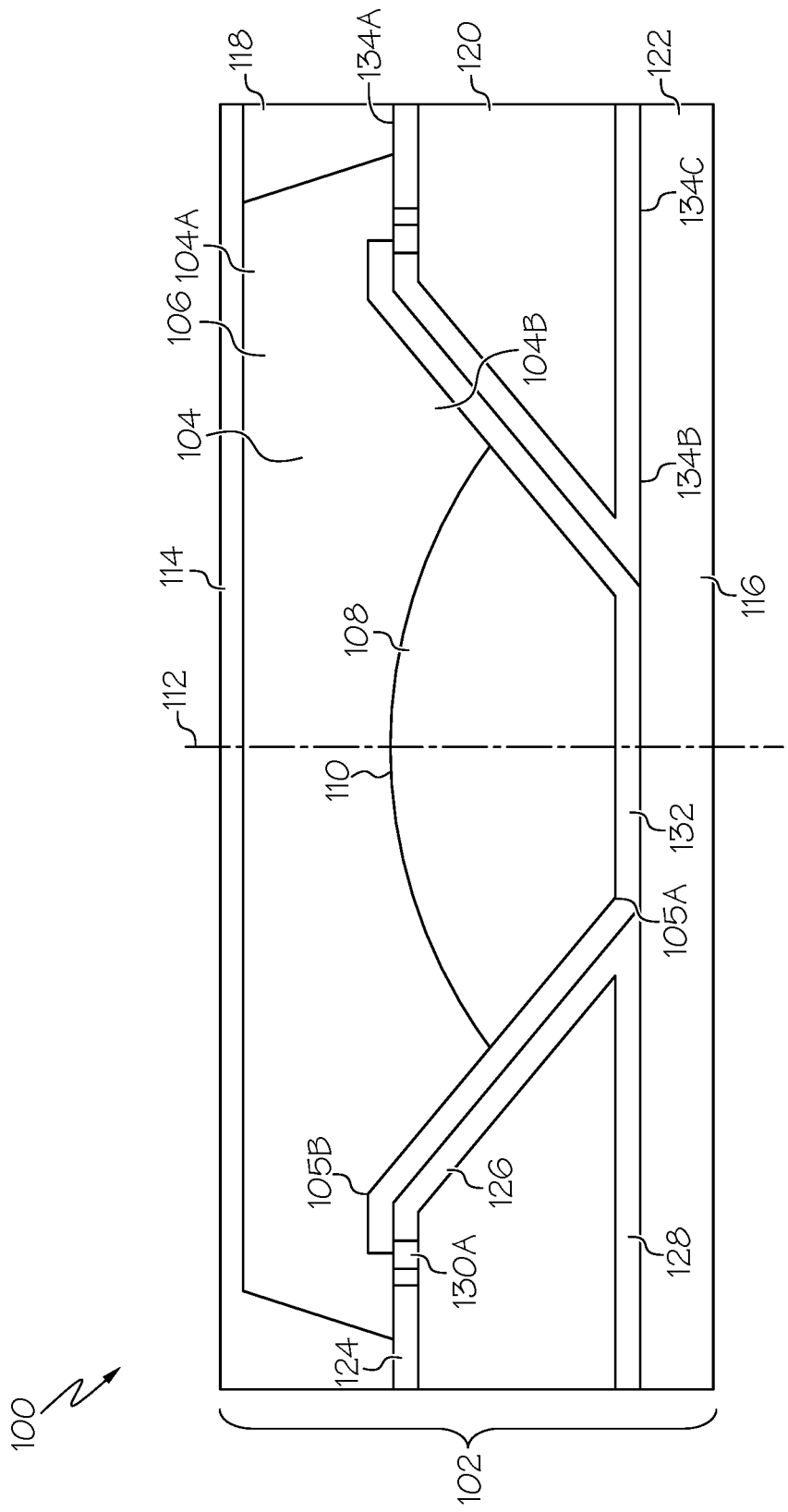
FIG. 1 schematically depicts a cross-section of a liquid lens, according to one or more embodiments shown and described herein.

Referring now to the figures, FIG. 1 is a schematic cross-sectional view of an embodiment of a liquid lens 100. Liquid lenses may be similar or identical to the liquid lenses described in U.S. Pat. No. 9,201,174, entitled "Liquid Lens Arrays," hereby incorporated by reference in its entirety, U.S. Patent Application Publication, No 2017/0315274, entitled "Camera Modules including Liquid Lens, Optical Device Including the Same, and Method of Manufacturing Camera Module Including Liquid Lens" hereby incorporated by reference in its entirety, and/or U.S. Pat. No. 9,952,358, entitled "Method to Prevent Emulsion in a Liquid Lens," hereby incorporated by reference in its entirety. In some embodiments, a liquid lens 100 includes a lens body 102 and a cavity 104 formed in the lens body 102, as depicted in FIG. 1. A first liquid 106 and a second liquid 108 are disposed within cavity 104. In some embodiments, first liquid 106 is a polar liquid or a conducting liquid. Additionally, or alternatively, second liquid 108 is a non-polar liquid or an insulating liquid. In some embodiments, first liquid 106 and second liquid 108 are substantially immiscible with each other and have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of the liquid lens 100 (e.g., as a result of gravitational forces).

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of the first liquid 106 is disposed in the first portion 104A of cavity 104. Additionally, or alternatively, at least a portion of the second liquid 108 is disposed within the second portion 104B of cavity 104. For example, substantially all or a portion of the second liquid 108 is disposed within the second portion 104B of cavity 104. In some embodiments, the perimeter of interface 110 (e.g., the edge of the interface in contact with the sidewall of the cavity) is disposed within the second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110. In some embodiments, adjusting interface 110 changes the shape of the interface, which changes the focal length or focus of liquid lens 100. For example, such a change of focal length can enable liquid lens 100 to perform an autofocus function. Additionally, or alternatively, adjusting interface 110 tilts the interface relative to an optical axis 112 of liquid lens 100. For example, such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which the liquid lens can be incorporated.

In some embodiments, lens body 102 of liquid lens 100 comprises a first window 114 and a second window 116. In some of these embodiments, cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118, an intermediate layer 120, and a second outer layer 122. In some of these embodiments, intermediate layer 120 comprises a bore formed therethrough. First outer layer 118 can be bonded to one side (e.g., the object side) of intermediate layer 120. For example, first outer layer 118 is bonded to intermediate layer 120 at a bond 134A. Bond 134A can be an adhesive bond, a laser bond (e.g., a laser weld), or another suitable bond capable of maintaining first liquid 106 and second liquid 108 within cavity 104. Additionally, or alternatively, second outer layer 122 can be bonded to the other side (e.g., the image side) of intermediate layer 120. For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer 118 and the second outer layer 122, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first window 114. In some embodiments, first outer layer 118 comprises a recess as shown in FIG. 1, and first portion 104A of cavity 104 is disposed within the recess in the first outer layer. Thus, first portion 104A of cavity 104 is disposed outside of the bore in intermediate layer 120.

In some embodiments, cavity 104 (e.g., second portion 104B of the cavity) is tapered as shown in FIG. 1 such that a cross-sectional area of the cavity decreases along optical axis 112 in a direction from the object side to the image side. For example, second portion 104B of cavity 104 comprises a narrow end 105A and a wide end 105B. The terms "narrow" and "wide" are relative terms, meaning the narrow end is narrower, or has a smaller width or diameter, than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, or glass-ceramic material. In some embodiments, outer surfaces of first outer layer 118 and/or second outer layer 122 are substantially planar. Thus, even though liquid lens 100 can function as a lens (e.g., by refracting image light passing through interface 110), outer surfaces of the liquid lens can be flat as opposed to being curved like the outer surfaces of a fixed lens. In other embodiments, outer surfaces of the first outer layer and/or the second outer layer are curved (e.g., concave or convex). Thus, the liquid lens comprises an integrated fixed lens. In some embodiments, intermediate layer 120 comprises a metallic, polymeric, glass, ceramic, or glass-ceramic material. Because image light can pass through the bore in intermediate layer 120, the intermediate layer 120 may or may not be transparent.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, a heating device, a temperature sensor, and/or other electrical devices). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

In some embodiments, liquid lens 100 comprises an insulating layer 132 disposed within cavity 104. For example, insulating layer 132 comprises an insulating coating applied to intermediate layer 120 prior to bonding first outer layer 118 and/or second outer layer 122 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating. In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of the second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
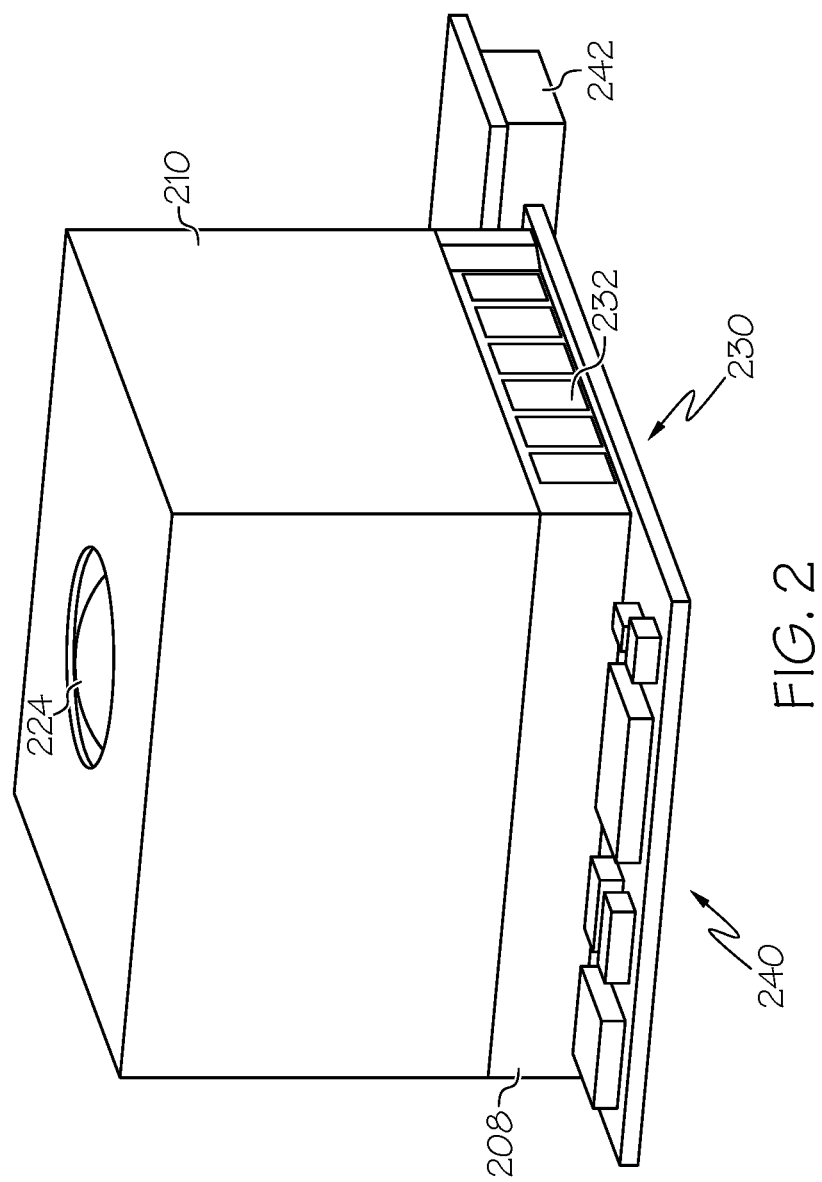
FIG. 2 depicts a camera incorporating a liquid lens, according to one or more embodiments shown and described herein.
Figure 3:
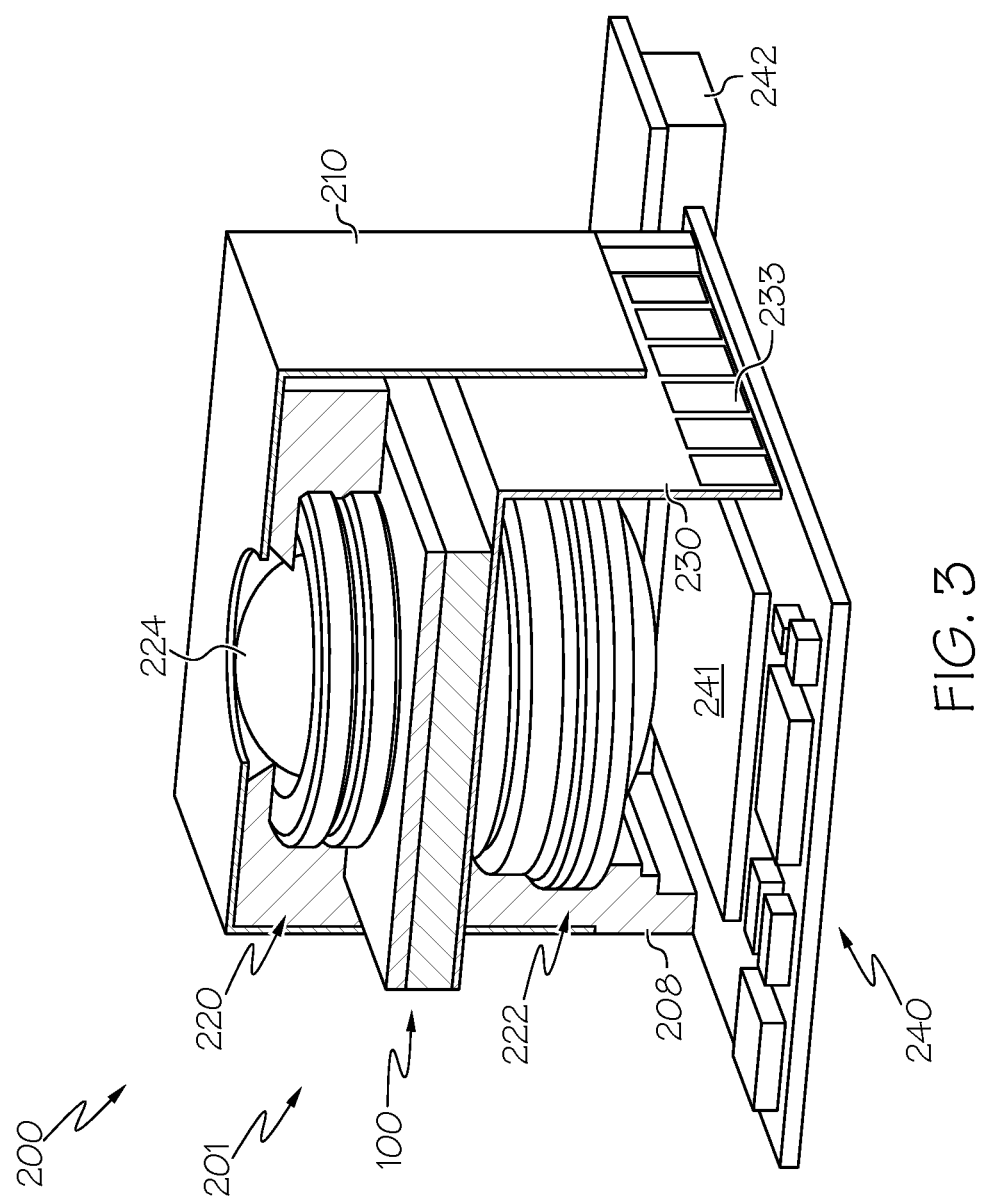
FIG. 3 depicts a sectional view of the camera of FIG. 2, according to one or more embodiments shown and described herein.

The liquid lens 100 as described herein may be incorporated into a camera module. FIG. 2 illustrates a camera module 200 according to various embodiments and FIG. 3 illustrates a sectional view of an interior of the camera module 200 including a lens assembly 201 of a camera module 200 according to an embodiment. The lens assembly 201 according to the embodiment may include a first lens unit 1100, a second lens unit 1200, the liquid lens 100, a base 208, a printed circuit board 230, and a cover member 210. These elements and alternative embodiments of camera modules are described in greater detail in U.S. Patent Application Publication No. 2017/0315274, entitled "Camera Module Including Liquid Lens, Optical Device Including the same, and Method of Manufacturing Camera Module Including Liquid Lens," hereby incorporated by reference in its entirety. It is noted that the camera module 200 may include a fewer or greater number of components than those shown without departing from the scope of the present disclosure.

Referring to FIG. 3, the first lens unit 220 is a front part of the lens assembly, on which light is incident from outside the lens assembly. The first lens unit 220 may comprise at least one lens. For example, two or more lenses may be aligned in the optical-axis direction to form an optical system. Here, the central axis may be the same as the optical axis of the optical system. The first lens unit 220 may be mounted in the base 208. A through-hole may be formed in the base 208, and the first lens unit 1100 may be disposed in the through-hole. The first lens unit 220 may include an exposure lens 224. The exposure lens 224 is a lens that protrudes out of the base 208 so as to be exposed to the outside. The exposure lens 224 may be made out of wear resistant materials and/or a cover glass or polymer material may be disposed over the exposure lens.

The second lens unit 222 may be disposed at the rear of the first lens unit 220 and the liquid lens 100. Light incident on the first lens unit 220 from the outside may pass through the liquid lens 100, and may be incident on the second lens unit 222. The second lens unit 222 may be disposed in the through-hole formed in the base 208 so as to be spaced apart from the first lens unit 220. The second lens unit 222 may comprise at least one lens. For example, two or more lenses may be aligned in the optical-axis direction to form an optical system. The second lens unit 222 may be mounted in the base 208.

The liquid lens 100 may be disposed between the first lens unit 220 and the second lens unit 222, and may be mounted in the base 208. The first lens unit 220, the second lens unit 222, and the liquid lens 100 may be disposed so as to be opposite to each other in the optical-axis direction. In addition, the focuses of the first lens unit 220, the second lens unit 222, and the liquid lens 100 may be aligned with each other in the optical-axis direction such that the camera module takes a high-quality image. That the focuses are aligned with each other in the optical-axis direction may mean that the focuses of the first lens unit 220, the second lens unit 222, and the liquid lens 100 are arranged on the same line or are located at least within a designed range, when viewed in the optical-axis direction.

The printed circuit board 230, which is coupled to the liquid lens 100, may also be mounted in the base 208. The printed circuit board 230 may be connected to the liquid lens 100 at terminals 233 provided at both ends thereof. Accordingly, the terminals 233 provided at one end of the printed circuit board 230 may be coupled and connected to the liquid lens 100, and the terminals 233 provided at the other end of the printed circuit board 230 may be connected to the external power supply. The optical assembly 201 and the circuit board 230 may fit within the cover 210. The cover 210 may allow for the terminals 233 at the end of the printed circuit board 230 to be exposed for connection to the external power supply.

In some embodiments, the cover member 210 may be formed in a hollow shape having an open lower portion and a through-hole, through which the front portion of the first lens unit 220 is exposed.

As shown in FIGS. 2 and 3, the camera module 200 according to the embodiments may further include an image sensor 241, and a sensor holder 240.

The image sensor 241 is a region which is disposed opposite to the lens assembly 201 in the optical-axis direction and on which light that has been sequentially transmitted through the first lens unit 220, the liquid lens 100, and the second lens unit 222 is incident to form images.

Meanwhile, although not shown, a filter for improving the quality of a taken image may be provided between the second lens unit 220 and the image sensor 241 or another position along the optical axis. For example, the filter may be an infrared cutoff filter.

The image sensor 241 may be mounted on the sensor holder 240, and may be coupled to the base 208. In addition, various elements for operating the camera module 200 may be mounted to the sensor holder 240. In addition, the sensor holder 240 may be connected to the printed circuit board 230.

Connection portions (not shown) configured to be connected to the terminals 233 formed at the printed circuit board 230 may be formed at the sensor holder 240. The terminals 233 and the connection portions may be coupled to each other by soldering or using a conductive adhesive.

In addition, the sensor holder 240 may be provided with a connector 242 for connection with the external power supply. Consequently, the liquid lens 100 may be connected to the external power supply via the printed circuit board 230, the sensor holder 240, and the connector 242 so as to be driven by current from the external power supply.

Figure 4:
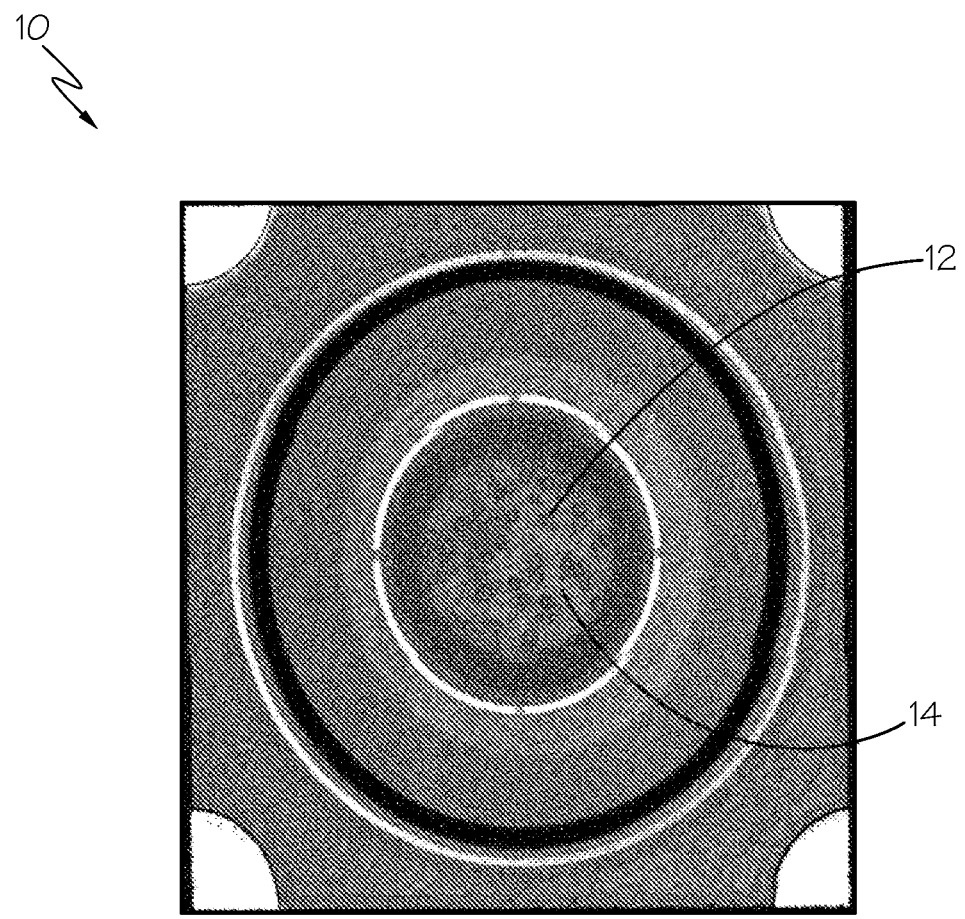
FIG. 4 depicts a photograph of a liquid lens experiencing an emulsification according to one or more embodiments shown and described herein.

Handheld smart devices, e.g., smart phones, tablets, and the like, have provided people with quick and convenient access to a variety of information. These devices are also often equipped with a front and/or rear camera. However, due to the handheld nature of the smart devices, these devices may experience impact events from drops, bumps, and other force applications. Referring now to FIG. 4, when a liquid lens 10, experiences excessive jostling, such as what may occur during a drop or other impact of a smart device incorporating a liquid lens, an emulsion may occur in the lens. FIG. 4 is an image of a liquid lens 10 exhibiting emulsion due to repeated high shock loads. The top down view clearly shows the droplets 12 of one liquid (appearing relatively dark) suspended in the other liquid 14 (appearing relatively light) in the center of the image. The existence of an emulsion of this sort will naturally detract from the ability of the lens to respond as desired to electrode drive signals aimed at altering the curvature of a single smooth meniscus between the two liquids in an un-emulsified state. In some impact events, the liquid lens 10 may even crack and lose fluid, leading to mechanical failure. Accordingly, it is desirable to test a design of a liquid lens, e.g., above described lens 100, to ensure its reliability (e.g., resistance to substantial emulsification or fracture). Accordingly, various impact tests are described herein to measure the reliability of the liquid lens 100, as described herein.

The various impact tests as will be described herein test for mechanical failure including fracture of components of the lens and/or substantial emulsification of the liquid within the lens. A substantial emulsification may be described in some cases as visible emulsification of the second fluid of the liquid lens within the first fluid of the liquid lens. In some cases substantial emulsification may be quantified by the amount of the second fluid that is emulsified in the first fluid (e.g., the amount of the second fluid present as smaller drops dispersed in the first fluid as opposed to being present in the larger volume or drop of second fluid disposed in contact with the insulating layer 132 as shown in FIG. 1). In some embodiments, the dispersed phase of the emulsion (e.g., the second fluid) comprises a plurality of droplets dispersed in the dispersion medium phase (e.g., the first fluid). For example, the droplets can comprise microscopic droplets, or microdroplets, with a mean diameter of about 100 μm, about 90 μm, about 80 μm, about 70 μm, about 60 μm, about 50 μm, about 40 μm, about 30 μm, about 20 μm, about 10 μm, about 1 μm, about 0.5 μm, about 0.1 μm, or any and all values and ranges therebetween. For example, substantial emulsification may be described as 10% or more of the second fluid emulsifying into the first fluid, 20% or more of the second fluid emulsifying into the first fluid, 30% or more of the second fluid emulsifying into the first fluid, 50% or more of the second fluid emulsifying into the first fluid. In some embodiments, substantial emulsification may be indicated by estimating the viewing area of the liquid lens that includes separated droplets of the first fluid. For example, a substantial emulsion may include 10% or more of a viewing area of the liquid lens (e.g., the portion of the lens receiving light incident thereon) having separated droplets, 20% or more of the viewing area having separated droplets, 50% or more of the viewing area having separated droplets, etc. In some embodiments, a substantial emulsion may be determined based on the average droplet size. For example, the smaller the droplet size, the more stable the emulsion, which takes longer to separate back to the original orientation of the fluids. For example, an average droplet size of less than about 100 μm, than about 50 μm, than about 20 μm, etc. may indicate a substantial emulsion.

As will be described in greater detail with reference to the specific impact tests, a liquid lenses as described herein have a survivability rate. Such survivability rate may be determined by performance of one or more of the impact tests described in greater detail below. Survivability rate refers to the likelihood of the liquid lens to be free of failure following application of an impact test. For example, liquid lenses subjected to the impact tests as described herein may be at least 60% free of failure (i.e., a 60% survivability rate), may be at least 70% free of failure (i.e., a 70% survivability rate), may be at least 80% free of failure (i.e., a 80% survivability rate), may be at least 90% free of failure (i.e., a 90% survivability rate), may be at least 95% free of failure (i.e., a 95% survivability rate), may be at least 96% free of failure (i.e., a 96% survivability rate), may be at least 97% free of failure (i.e., a 97% survivability rate), may be at least 98% free of failure (i.e., a 98% survivability rate), may be at least 99% free of failure (i.e., a 99% survivability rate), etc. As used herein, the term failure refers to fracture of the liquid lens and/or substantial emulsification of the fluids within the liquid lens. Failure may additionally refer to a loss or change in optical performance, wherein an optical performance falls below a predetermined threshold (e.g., a loss of 5-10% optical performance). For example, diopter refers to a magnifying property of a lens. A certain diopter voltage applied by the electrode of the liquid lens may cause the correlate to a particular diopter (e.g., 2 diopter) experienced by the liquid lens. That is, upon application of a diopter voltage corresponding to a known diopter, the shape of the interface between the first liquid and the second liquid adjusts to provide that diopter. When a liquid lens is damaged, it may not respond to the same diopter voltage to provide the same shape, which may result in a loss of diopter or other optical performance. In application, the curvature of the interface of the liquid lens may be measured when applying a predetermined diopter voltage pre-impact test and compared to the curvature of the interface of the liquid lens post impact test when energized to the same diopter voltage. The percent change in shape between the pre-impact shape and the post-impact shape. May correlate to the percentage loss of optical performance (e.g., see FIG. 19). A percentage change in shape of about 5% to about 10% may be indicative of a failure.

The Testing Assembly

Figure 5:
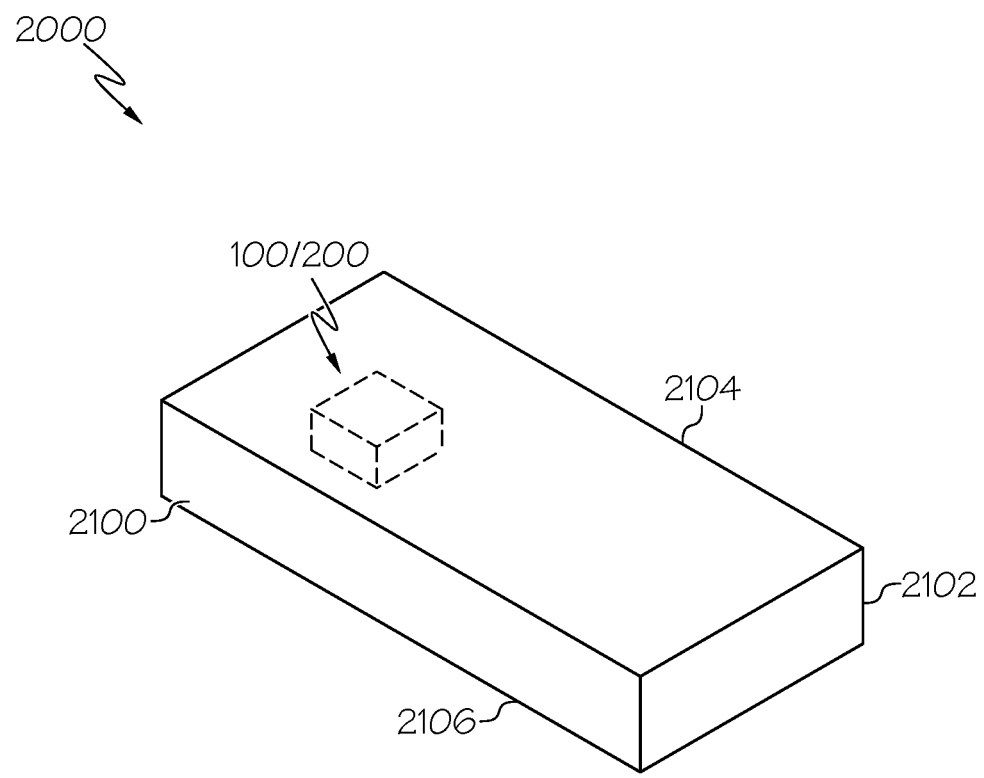
FIG. 5 depicts a test frame according to one or more embodiments shown and described herein.

As will be described in greater detail herein, impact tests of the present disclosure may include, for example, a drop test, a pendulum test, and/or a ball drop test. To test either the liquid lens or the liquid lens as incorporated in a camera module, the liquid lens or the camera module may be mounted into a test frame to simulate the housing of a smart device. FIG. 5 illustrates a testing assembly 2000 including a test frame 2100 with one of the camera module 200, including a liquid lens 100, or just the liquid lens 100 mounted therein. The frame 2100 may be constructed such that forces applied to the frame 2100 and then transferred to the liquid lens 100/camera module 200 approximate force transfers between a frame of a smart device and a liquid lens/cameral module in a real world setting.

The test frame 2100 may include a front wall 2104 and a back wall 2106. The front wall 2104 and back wall 2106 may be oriented substantially parallel to one another. Each of the front wall 2104 and the back wall 2106 may be made from one of a glass, metal, polymer, or a combination thereof. The front wall 2104 and the back wall 2106 may be made from the same or different materials. The front wall 2104 and the back wall 2106 may or may not be approximately the same size.

The front wall 2106 and the back wall 2104 may be connected by a connecting wall 2102. The connecting wall 2102 may rigidly couple the front wall 2104 to the back wall 2106. The connecting wall 2102 may extend along a shared perimeter portion of the front wall 2104 and back wall 2106. The connecting wall 2102 may extend along an entire shared perimeter of the front wall 2104 and back wall 2106 or only a portion thereof. Alternatively, the connecting wall 2102 may extend along an entire perimeter of the front wall 2104 and only a portion of a perimeter of the back wall 2106. For example, in some embodiments, the back wall 2106 may be a tab that is smaller than the front wall 2104 and extends from the connecting wall 2102. In some embodiments, the connecting wall 2102 may be curved to mimic the contours of a smart device.

Figure 6A:
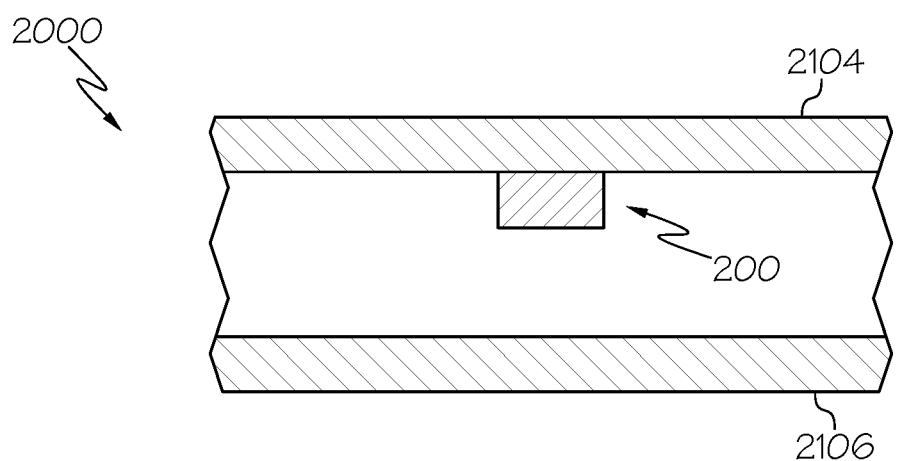
FIG. 6A depicts a cross section of the test frame of FIG. 6, according to one or more embodiments shown and described herein.

FIG. 6A illustrates the camera module 200 mounted within the test frame 2100 of the testing assembly 2000. In the present embodiment, the camera module 200 is mounted directly to the front wall 2104 and is spaced from the back wall 2106. It is contemplated that the camera module 200 may be mounted to the front wall 2104 using various techniques including but not limited to adhesives, brackets, fasteners, and the like.

Figure 6B:
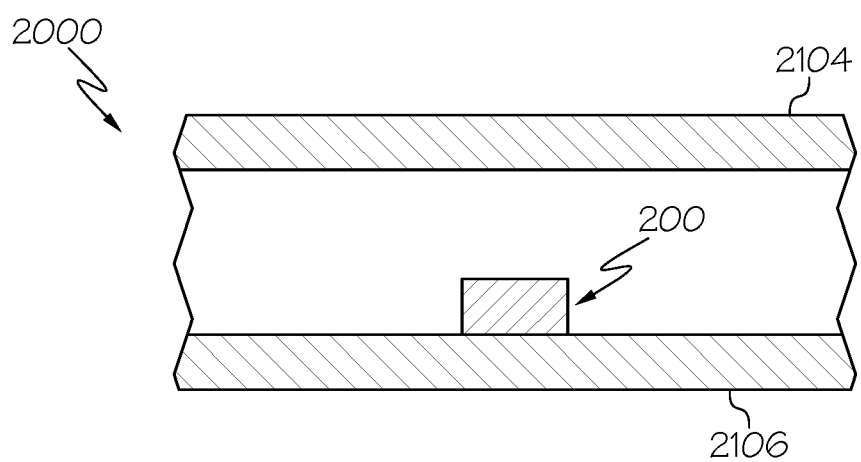
FIG. 6B depicts an alternative cross section of the test frame of FIG. 5, according to one or more embodiments shown and described herein.

Referring now to FIG. 6B the camera module 200 may instead be mounted to the back wall 2106 and be spaced from the front wall 2104. Placement of the camera module 200 on either the front wall 2104 or the back wall 2106 may correspond to a position of a front facing camera or a rear facing camera, respectively, in a smart device. It is contemplated that in some embodiments, the camera module 200 may be in contact with both the front wall 2104 and the back wall 2106 simultaneously.

Figure 7:
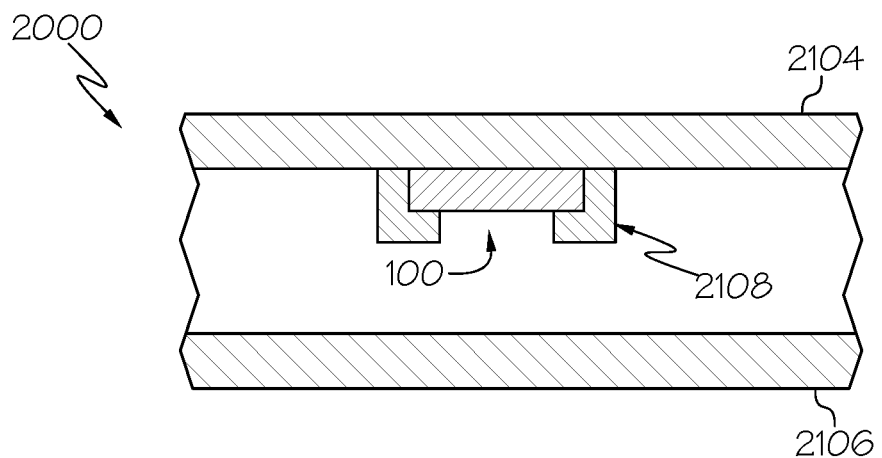
FIG. 7 depicts an alternative cross section of the test frame of FIG. 5, according to one or more embodiments shown and described herein.

Referring now to FIG. 7, in some embodiments the liquid lens 100 may be mounted to the test frame 2100 without the rest of the camera module. In such case, and as illustrated in FIG. 7, prongs 2108 may extend from one of the front wall 2104 (as illustrated), the back wall 2106, or the connecting wall 2102 to hold the liquid lens 100 in a position corresponding to a position of a lens within a smart device. The prongs 2108 may define a slot for receiving and retaining the liquid lens 100 for testing. The prongs 2108 may be configured to simulate the remaining structure of the camera module such that forces transferred to the liquid lens 100 during an impact test are approximate to those experienced by a camera module within a smart device. Such embodiments may enable efficient testing of the liquid lens 100 without first incorporating the liquid lens into a camera module.

The Drop Test

Drop tests have been applied to glass articles to test the strength of the glass when dropped on a surface. Such drop testing is described in U.S. Patent Application Publication No. 2015/0030834, entitled "Strengthened Glass Articles having Improved Survivability," hereby incorporated by reference in its entirety. It is noted that the glass articles tested in U.S. Patent Application Publication No. 2015/0030834 may be exchanged for the testing assembly 2000 described above, and the test then performed as described. In particular, and with reference to FIG. 8, a drop test assembly 300 is schematically depicted. In general, the drop test includes dropping the test frame 2100 in a direction D, with the liquid lens 100 or camera module 200 attached thereto. After dropping, the liquid lens 100 may be visually inspected for damage (e.g., leaking fluid) and/or substantial emulsification.

Figure 8:
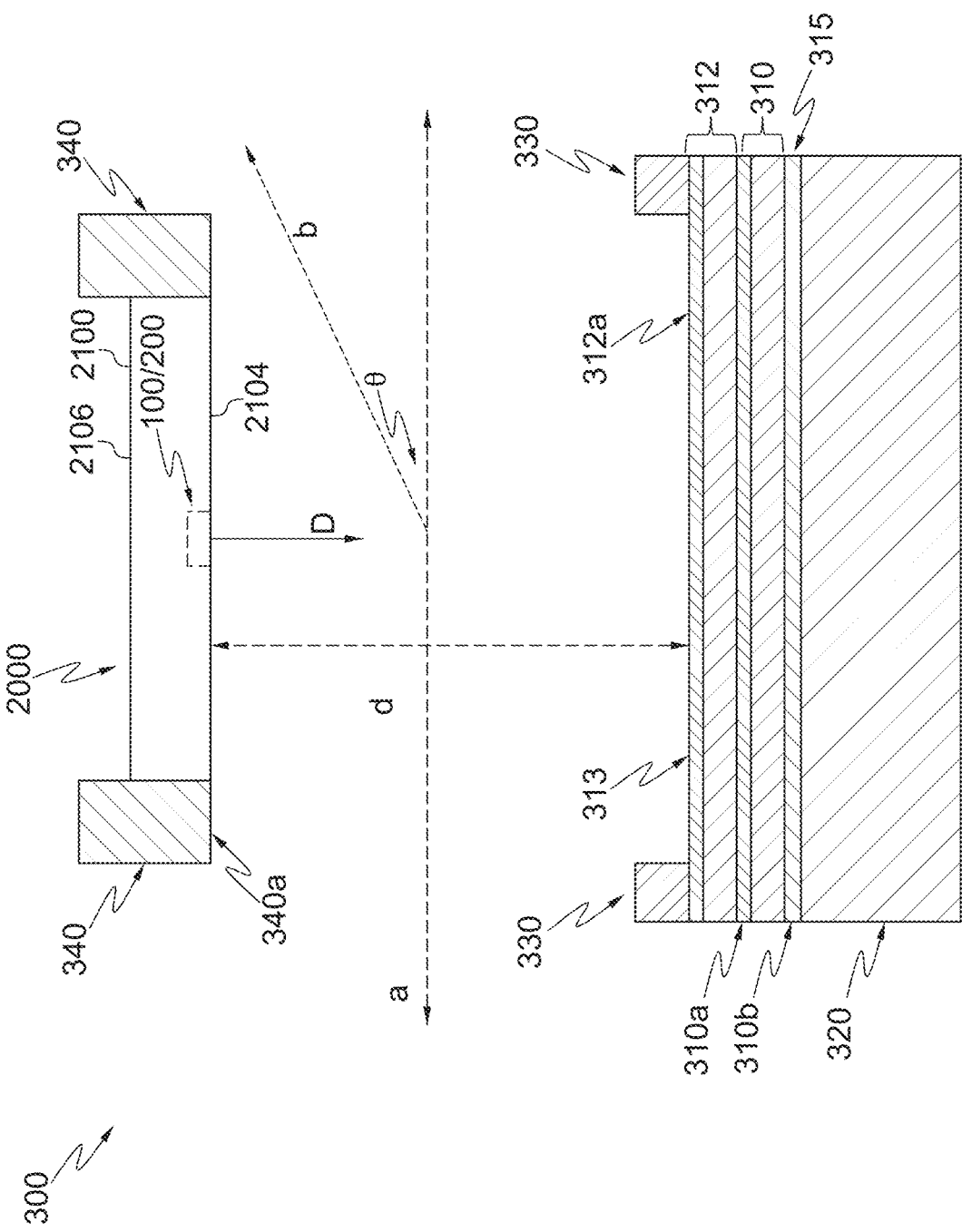
FIG. 8 depicts a drop test assembly according to one or more embodiments shown and described herein.

While various structures may be used in performing a drop test as described herein, a Yoshida Seiki DT-205 Drop Test System or test system of a similar structure may be utilized. FIG. 8 schematically illustrates a cross section view of the drop test assembly 300. The drop test assembly 300 may include a steel base plate 320 (e.g., a steel plate having a thickness of approximately ¾ in.) and rectangular polymer jaws 340 with vertical parallel faces. The jaws 340 are supported by or otherwise part of a test stand that holds the test frame 2100 with the liquid lens 100 or camera module 200 at a distance d above a drop surface 313. The jaws 340 may be angled relative to the horizontal axis a by an angle θ so that various drop angles and their effect on the liquid lens 100 may be observed. The test frame 2100 is positioned between the jaws 340 so as to be flush with a bottom surface of the jaws 340 or extend past the bottom surface of the jaws 340.

The drop test surface 313 may include two pieces of sand paper (e.g., two pieces of 9×11" Rhynowet 180 grit alumina sandpaper.) A first piece of sandpaper 310 having an abrasive surface 310a may be centered below the drop tester jaws 340 and the back surface 310b may be adhered to the steel base plate 320 of the drop tester with a thin layer of Scotch Spray Mount™ contact adhesive 315, or the like, to prevent lateral movement of the actual drop surface. The adhesive may be allowed to dry thoroughly to ensure that the first piece of sandpaper 310 does not buckle or shift during the drop test.

A second piece of sandpaper 312, which forms the actual drop surface 313, may be aligned to fully cover the first piece of sandpaper 310 with the abrasive side 312a facing upward, without adhesive being used to secure the first piece 312 to the second piece 310 of sandpaper. Instead, the second piece of sandpaper 312 may be held in place with four rare earth magnets 330 in each corner. Each magnet 330 may be covered with a polymer fingertip (not shown) cut from a cut-resistant glove to prevent contact damage to the front wall of the test frame (e.g., cover glass) if the device bounces to the side.

The same second sheet of sandpaper 312 may be used for the entire drop sequence of an individual test assembly 2000. A new second piece of sandpaper 312 may be used to test subsequent test assemblies.

In some embodiments, there may be no sandpaper. Instead, the drop test surface 313 may be free from sandpaper. For example, the steel base plate 320 may provide a drop test surface.

The test assembly 2000 (i.e., the test frame 2100 with the liquid lens 100/camera module 200 attached) may be loaded into the drop tester jaws 340 with the front wall facing downward. Though the liquid lens 100/camera module 200 is illustrated as being mounted to the front wall 2104 of the test frame 2100, as noted herein the liquid lens 100/camera module 200 may be mounted to the back wall 2106 of the test frame 2000. The front wall 2104 of the test frame 2100 may be positioned parallel to the plane of the drop surface (as in FIG. 8) or, as noted above, the front wall 2104 may be angled at some non-zero angle relative to the plane of the drop surface 313.

To ensure a smooth release, the jaws 340 may not contact any features of the test frame 2100 that extend beyond the contact surface 313. The jaws 340 only contact the opposite edges of the test frame 2100. The edges of the test frame 2100 may be aligned to contact the vertical midpoints of the jaws 340, which may be centered on the jaw air piston actuators (not shown). This may minimize the potential for any variable non-normal forces and protect against extraneous or variable forces that could be imparted to the test frame.

The drop tests may be performed under ambient conditions (air, room temperature). The first drop may be performed at a starting height of about 20 cm, which represents the distance from the exposed surface of the front wall 2104 of the test frame to the top of the drop surface 313. If no mechanical failure (e.g., leakage and/or substantial emulsification of the liquids) occurs, the drop height may be increased by 10 cm intervals and the test repeated. The height can be increased until mechanical failure occurs or until a maximum drop height is reached. For example, the maximum drop height may be 220 cm.

For each test frame, the magnets 330 and the used top piece of alumina sandpaper 312 may be removed. The steel drop tester base plate 320 and the bottom first piece of alumina sandpaper 310 may be cleaned with a brush and then subjected to compressed air to remove loose contaminants such as, for example, particles freed from the sandpaper surface or fragments of the liquid lens 100/camera module 200/test frame 2100. At which point, the above drop procedure may be performed again.

As noted above, the attitude of the test assembly 2000 may be adjusted such that front wall 2104 of the test frame 2100 contacts the drop surface 313 at either a flat angle or at a non-flat angle. As used herein, "flat angle" means parallel to the plane (a in FIG. 8) of the drop surface 313, whereas "non-flat angle" refers to an orientation at an acute angle (e.g., b and θ in FIG. 8) with the plane a of the drop surface 313. In the examples below, the non-flat angle θ is 30° relative to plane and the drop surface 313. Additionally, the test frame 2100 may be dropped on any edge or face of the test frame 2100. In some embodiments, the survivability rate may be determined by a combination of drop tests performed on different edges and faces of the test frame 2100.

To determine the survivability rate of the liquid lens 100 when dropped from a predetermined height, the drop test assembly 300 and drop surface preparation described hereinabove is used. During the test, each test assembly 2000 is dropped a single time from the predetermined height (e.g., 100 cm, 200 cm, or more) and the liquid lens 100 is visually (i.e., with the naked eye) examined for evidence of fracture and/or substantial emulsification. In some embodiments, the drop test may be performed multiple times on a test assembly 2000. In some embodiments, the test frame 2100 may be dropped at a different orientation each time such that impact is coincident on each or some edges and faces of the test frame 2100. A sample is deemed to have "survived" the drop test if no fracture or substantial emulsification as described herein is observed after being dropped. Additionally, and as noted above, optical performance may be measured and compared to a baseline optical performance. For example, one indicator of optical performance may be the magnifying property (diopter) of the liquid lens. As described above, the shape of the interface between the first liquid and the second liquid of the liquid lens may be observed upon application of a known diopter voltage (e.g., a voltage known to correspond to a particular diopter). When a certain diopter voltage is applied, the shape of the interface between the first liquid and the second liquid may change to achieve the corresponding diopter. Stated another way, the curvature of the interface may adjust based on the applied diopter voltage. This curvature may be measured. After performance of the drop test, e.g., immediately after, 10 minutes after, 15 minutes after, 30 minutes after, 1 hour after, etc., the diopter voltage configured to achieve a certain diopter (e.g., 2 diopter) may be applied, and the shape of the interface of the liquid lens compared to a shape of the interface, under the same voltage, prior to application of the drop test to determine a percentage of change in optical performance. A sample is deemed to have "survived" the drop test if no fracture or substantial emulsification is observed after being swung and/or the optical performance is substantially maintained (e.g., 80% optical performance maintained, 90% optical performance maintained, 95% optical performance maintained, 99% optical performance maintained). The survivability rate is determined to be the percentage of the sample population that survived the drop test. For example, if 7 samples out of a group of 10 did not fracture/substantially emulsify, or have substantially reduced optical performance when dropped, the survivability rate would be 70%. Liquid lenses according to the present disclosure have a survivability rate, or resistance to mechanical failure, of about 90% or greater, about 80% or greater, about 70% or greater, about 60% or greater.

The Pendulum Test

A pendulum test is fully described in U.S. Provisional Application No. 62/555,363, entitled "Impact Testing Apparatus and Methods," hereby incorporated by reference in its entirety. It is noted that the glass sheets tested in U.S. Provisional Application No. 62/555,363 may be exchanged for the testing assembly 2000 described above, and the test then performed as described. For example, a pendulum test includes a pendulum test assembly having a bob wherein the test assembly 2000 is coupled to or incorporated in to the bob. The pendulum test assembly is configured to cause the test assembly 2000 to contact a surface of an impacting object, which can be a smooth or roughened surface. In one or more embodiments, to perform the test, the test assembly 2000 is loaded on a holder and then pulled backwards from the pendulum equilibrium position and released to make a dynamic impact on the impact surface. The test mimics a drop event, such that the test assembly 2000 is the moving part and the impact surface is the stationary part. The test assembly 2000 may be configured such that it can contact the impact surface at a major surface of the test frame 2100 (e.g., the front wall 2104 or the back wall 2105) or at an edge of the test frame 2100. The edge can be a straight edge, a curved edge, or a chamfered edge. In some embodiments, the edge may be a curved edge, to replicate a 2.5D cover for mobile electronic devices. In some embodiments, the test frame 2100 may be bent to provide a curvature to one of the surfaces of the test frame (e.g., the front wall 2104 or the back wall 2106). A curved surface may be employed to simulate a bending stress within a smart device observed in field failures. According to one or more embodiments of the apparatus, the test assembly 2000 is the moving part, and travels to strike the impacting object, which is the stationary part, replicating a smart device (moving part) dropped from a given height onto a surface (stationary part).

Figure 12:
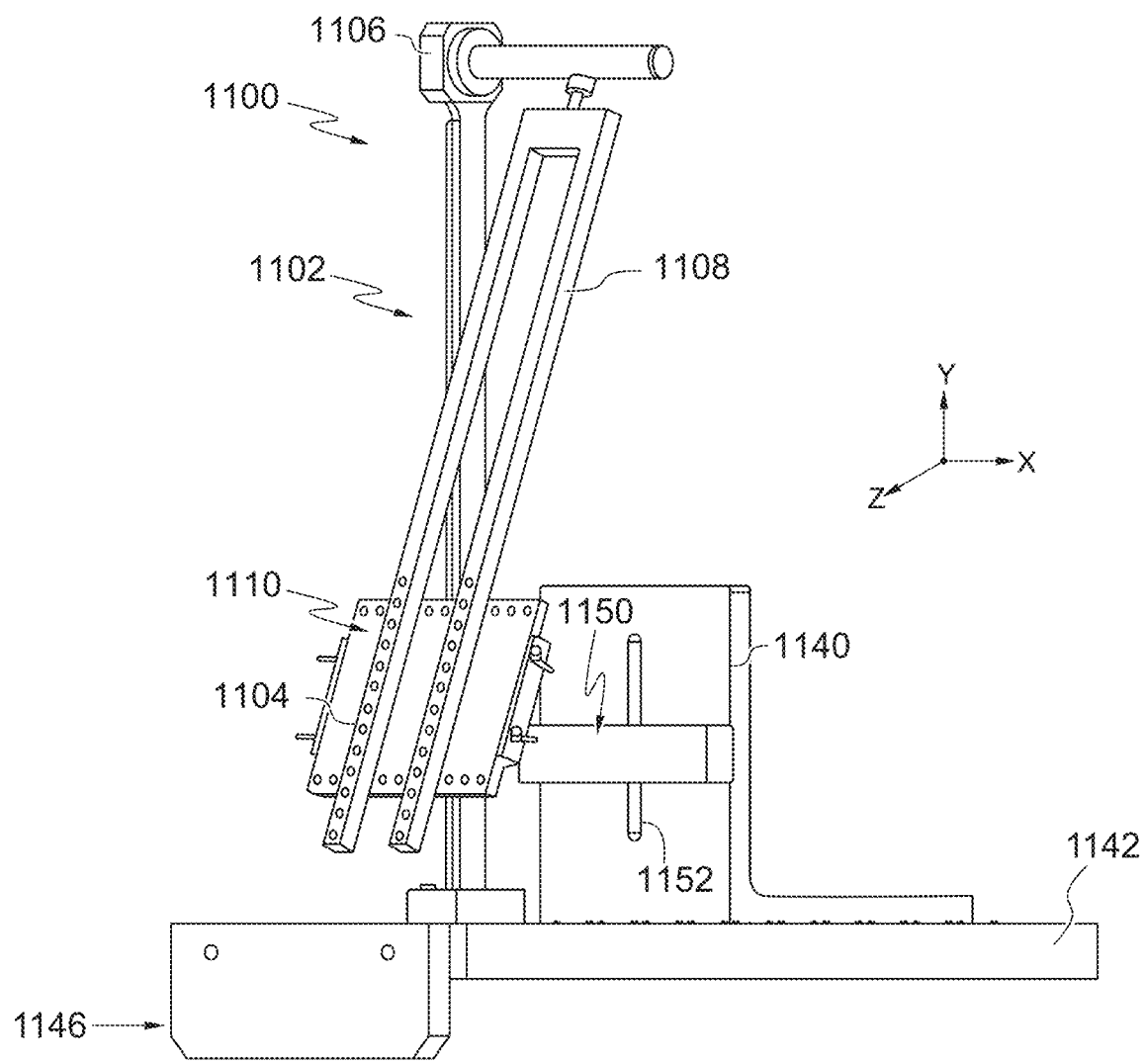
FIG. 12 illustrates a front perspective view of the pendulum test assembly shown in FIG. 9, according to one or more embodiments shown and described herein.
Figure 13:
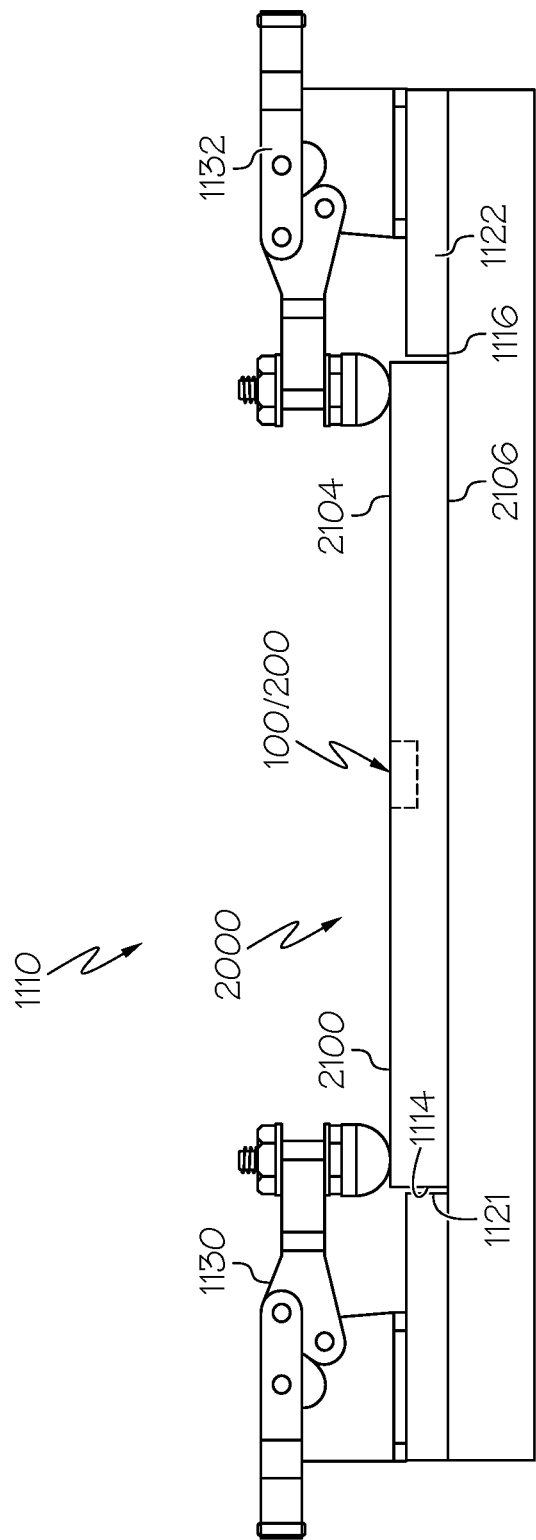
FIG. 13 depicts a detailed side view of a portion of the pendulum test assembly of FIG. 9, according to one or more embodiments shown and described herein.
Figure 14:
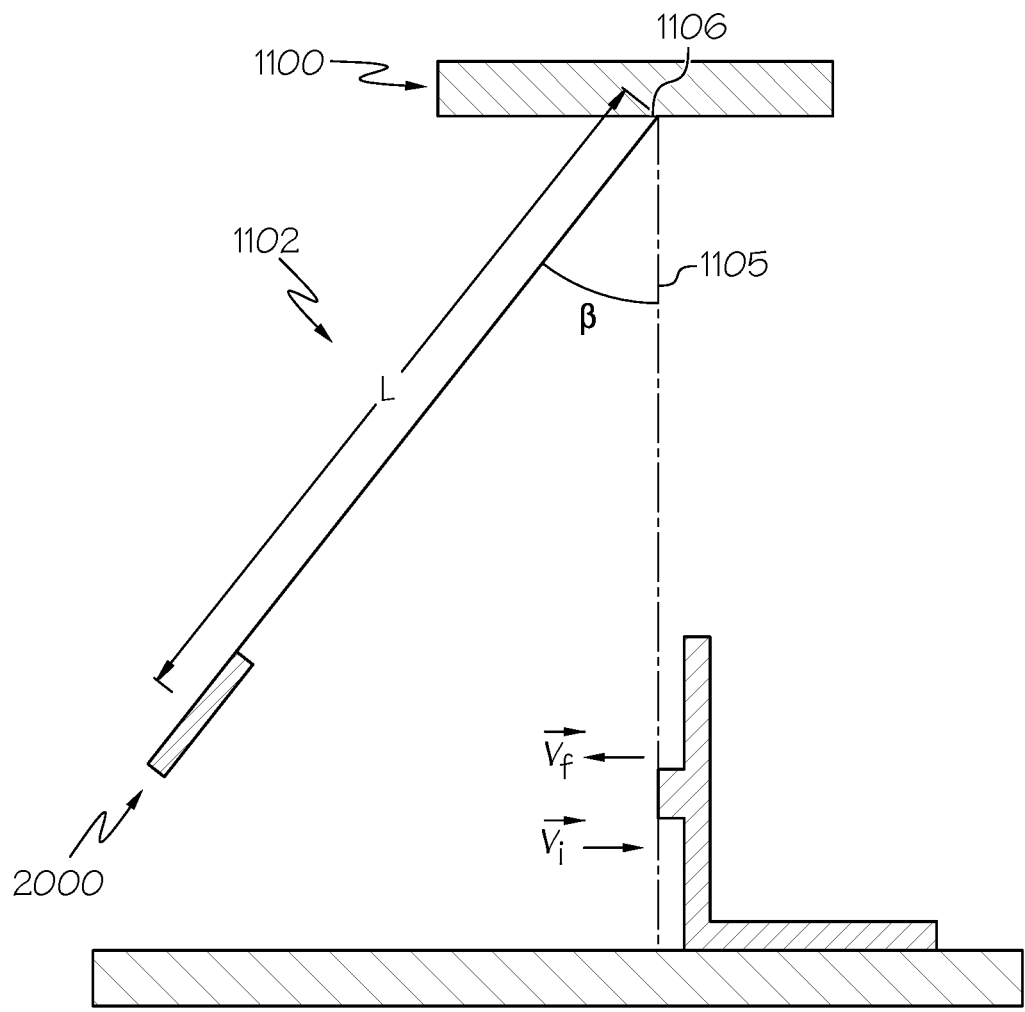
FIG. 14 depicts a side schematic view of a pendulum test assembly, according to one or more embodiments shown and described herein.

Referring now to FIGS. 9-14, an embodiment of a pendulum test assembly 1100 for impact testing a test assembly 2000 or test stand is shown as comprising a pendulum 1102 including a bob 1104 attached to a pivot 1106. As utilized herein, a "bob" on a pendulum is a weight suspended from and connected to a pivot by an arm. Thus, the bob 1104 shown is connected to the pivot 1106 by an arm 1108, which may be in the form of a string, a rod, or a plurality of rods, such as two rods as shown. As best shown in FIG. 14, the bob 1104 has an equilibrium position shown as dotted line 1105 such that the angle β between the position of the bob 1104 and the impacting object is zero. In other words, in the equilibrium position the arm 1108 is not in a raised position.

In some embodiments, the bob 1104 can simply be the test assembly 2000 to be tested, e.g., the test assembly 2000 may be affixed to the lower end of the arm 1108. In one or more embodiments, the bob 1104 includes a base 1110 for receiving the test assembly 2000, and the test assembly 2000 is affixed to the base. As shown in better detail in FIG. 13, the base 1110 for receiving the test frame 2000 may have a first end 1121 and a second end 1122. In some embodiments, the base 1110 may define a curved surface defining a radius of curvature between the first end 1121 and the second end 1122. In some embodiments, the base 1110 may not define a curved surface but may define a planar surface to which the test frame 2100 is attached. The base 1110 can be any suitable material to provide a platform to secure the test assembly 2000 for the test. Suitable materials for the base 1110 can include wood, metal, ceramic, plastic, or combinations thereof.

Still referring to FIG. 13, the base 1110 may include a first fixture 1130 and a second fixture 1132 to hold at least two ends of the test frame 2100 of the test assembly 2000. In some embodiments, the fixtures 1130, 1132 may apply a force to bend the test frame 2100 about the curved surface of the base 1110 described above and to conform the test frame 2000 to the radius of curvature of the base 1110. By bending the test frame 2100, the test frame 2100 may have an apex conforming to an apex of the curved surface of the base 1110. In one or more specific embodiments, the curved surface and the curvature of the specimen can be a fixed radius or a compound radius. In one or more embodiments, the first fixture 1130 and second fixture 1132 are spaced apart at a distance of a cover glass length for a mobile phone or a tablet. In specific embodiments, the first fixture and second fixture are spaced apart at a distance in the range of 50 mm and 500 mm. The first fixture 1130 and the second fixture 1132 may each independently be a clamp, and in specific embodiments are toggle clamps as shown in FIG. 14. However, other types of fixtures such as bar clamps, C-clamps, or other suitable fixtures to hold the ends of the specimen can be used.

The pendulum test assembly 1100 according to one or more embodiments may also include a roughened surface, not shown, which can be provided by an abrasive sheet having an abrasive surface to be placed in contact with an outer surface (e.g., front wall 2104) of the test frame 2100. In some embodiments, the abrasive sheet comprises sandpaper, which may have a grit size in the range of 30 grit to 400 grit, or 100 grit to 300 grit, for example 180 grit. A non-limiting example of suitable sandpaper is Indasa Rhynowet® Plus Line P180 grit sandpaper. The sandpaper according to one or more embodiments is cut in 25 mm square pieces, and the sandpaper is flattened if the pieces are bent during the cutting process.

Figure 11:
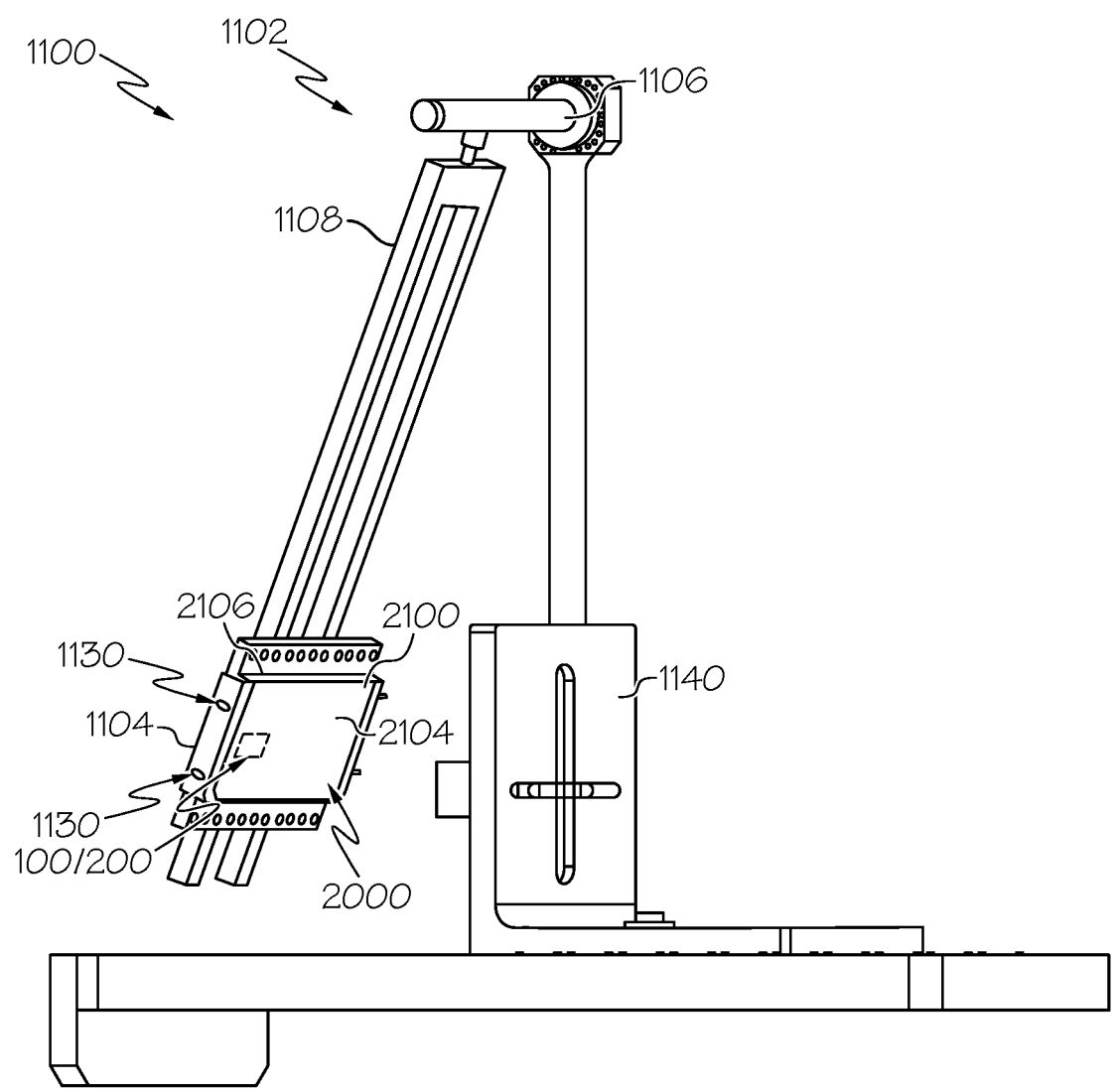
FIG. 11 illustrates a rear perspective view of the pendulum test assembly shown in FIG. 9, according to one or more embodiments shown and described herein.

Referring again to FIGS. 9-14, the pendulum test assembly 1100 further includes an impacting object 1140 positioned such that when the bob 1104 is released from a position at an angle greater than zero from the equilibrium position 1105, the surface of the test frame 2100 contacts the impacting object 1140. In the embodiment shown, the impacting object 1140 is an L-shaped bracket affixed to platform 1142, and the impacting object 1140 is affixed to the platform 1142 by screw 1144. The impacting object 1140 could also be affixed by any other suitable mechanism such as a bolt, rivet, clamp, etc. The impacting object includes a stopper 1146, which permits the apparatus 1100 to be held at the end of workbench 1148. In the embodiment shown, the impacting object 1140 is fixed and does not move when the bob 1104 contacts the impacting object 1140 at an impact surface. Referring to FIGS. 11 and 12, the impact surface 1150 may be a separate element that is adjustable in the x-y plane within slot 1152. In one or more embodiments, the bob 1104 and base 1010 are sized and shaped such that when a specimen is affixed to the base 1010 and when the bob is released from a position at an angle greater than zero from the equilibrium position, the test frame 2100 is subjected to a bending radius and an impact force that simulates a bending radius of a smart device (e.g., a mobile phone or tablet device) when the smart device is dropped on a ground surface by a user of the smart device.

In one or more embodiments, the radius of curvature of the base 1110 is selected to provide a bending tensile force of 100 MPa when test frame 2100 is bent around the base such that the tensile force is an externally applied tensile force that results from the stress of bending the test frame 2100. Thus, when the test frame 2100 is bent, the tensile force is present at the apex of the test frame 2100. According to one or more embodiments, the radius of curvature is in the range of from 0.25 m to 1.5 m, for example, in the range of from 0.5 m to 1 m.

Another aspect of the disclosure pertains to a method of impact testing a specimen, the method comprising: bending the test frame 2100 having a contact surface to provide a bent test frame 2100 having a radius of curvature and an apex on the contact surface; and impacting the bent test frame 2000 at the apex with an impacting object using a pendulum. In an embodiment, the bent test frame 2100 is attached to the pendulum bob. In an embodiment, the bent test frame 2100 is attached to the pendulum bob is moved such that the contact surface contacts the apex. In one or more embodiments, the test frame 2100 is configured with a radius of curvature that is in a range that simulates a bending radius of a smart device when smart device is dropped on a ground surface by a user of the smart device. Such bending may apply stresses to the liquid lens 100.

In one or more embodiments, an abrasive sheet is placed in contact with the apex of the specimen prior to impacting the specimen at the apex. In one or more embodiments, the specimen is secured to a curved surface prior to impacting the apex with the impacting object.

Another embodiment pertains to a method of impact testing a specimen, the method comprising: attaching the test assembly 2000 to a pendulum bob to expose a contact surface on the test frame 2100; and moving the pendulum bob with the test assembly 2000 attached to the pendulum bob to cause the contact surface to contact an impact object. In an embodiment, the method includes bending the test frame 2100 to provide a bent test frame 2100 having a radius of curvature and an apex on the contact surface. In an embodiment, the bent test frame 2100 attached to a pendulum bob is moved such that the contact surface contacts the apex. In an embodiment, the test frame 2100 is configured with a radius of curvature in a range that simulates a bending radius of a smart device when the smart device is dropped on a ground surface by a user of the smart device. In an embodiment, an abrasive sheet is placed in contact with the apex of the test frame 2000 prior to impacting the test frame 2000 at the apex. In an embodiment, the test frame 2000 is secured to a curved surface prior to impacting the apex with the impacting object.

Figure 9:
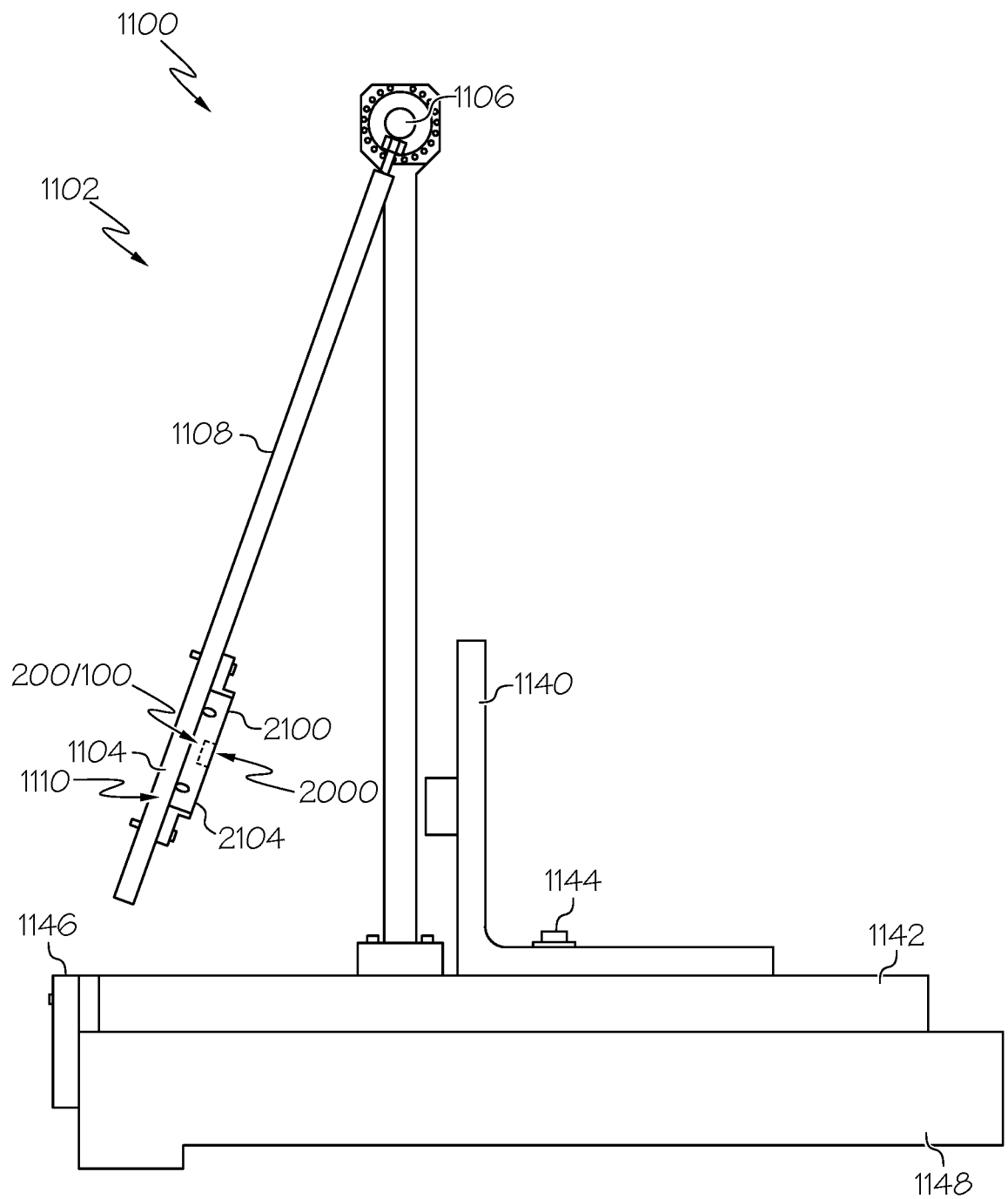
FIG. 9 depicts a pendulum test assembly, according to one or more embodiments shown and described herein.
Figure 10:
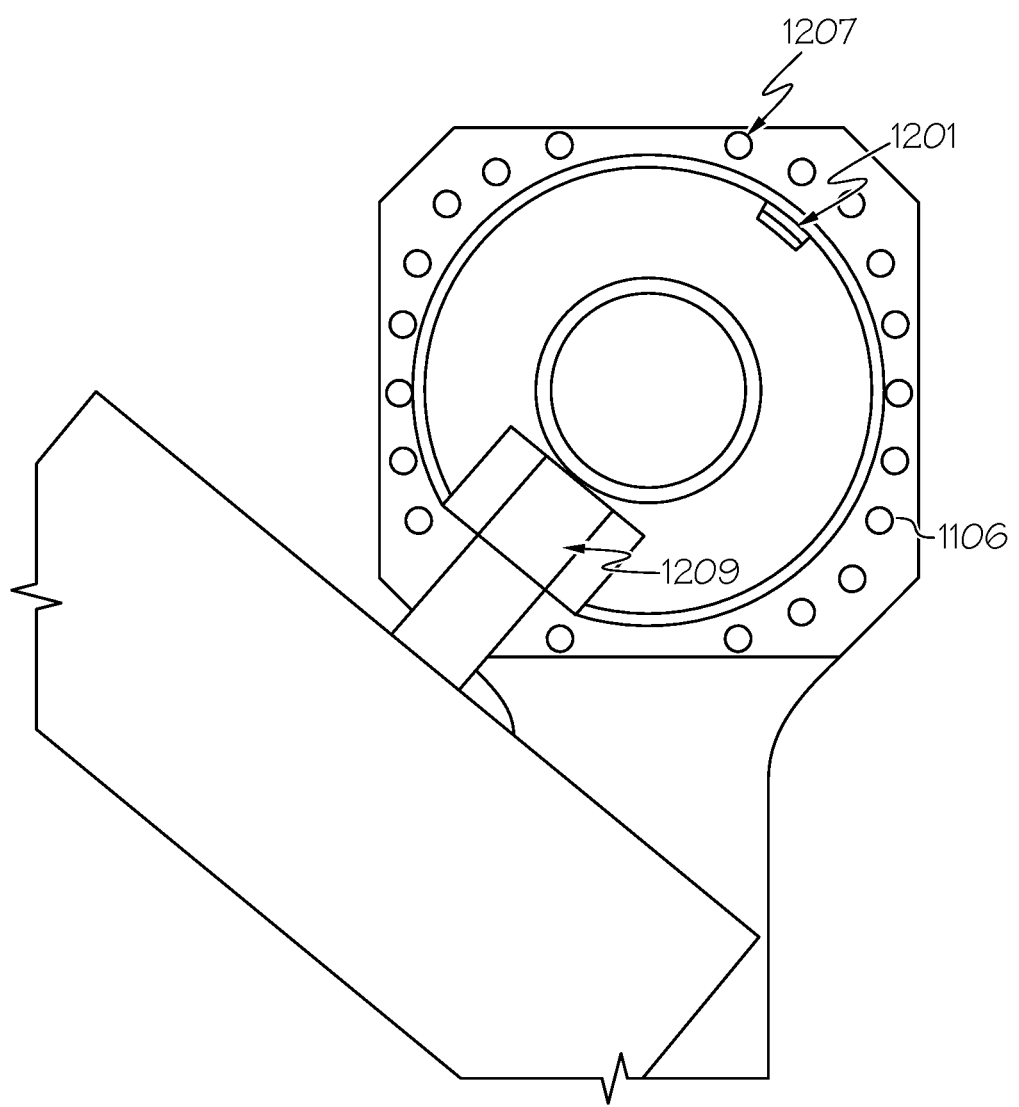
FIG. 10 depicts a detailed side view of a portion of the pendulum test assembly of FIG. 9, according to one or more embodiments shown and described herein.

Referring now to FIGS. 9 and 10 specifically, non-limiting details of operation of the apparatus include a pointer notch 1201 on the pivot 1106, which can point to various test positions 1207. The arm is the part of the pendulum test assembly 1100 where the base 1110 is mounted and through which motion of the pendulum is initiated. The base provides a sample holder to hold the test assembly 2000 to be tested. Fixtures 1130, 1132 help secure the test frame 2100 of the test assembly 2000 to the pendulum test assembly 1100. The stopper 1146 helps secure the equipment to the workbench 1148 before, during and after impact. The pointer notch 1201 enables alignment with a variety of test positions 1207, which may be any suitable number of test positions between 1 and 50. In the embodiment shown, there are eleven test positions 1207. The pendulum test assembly 1100 may further include a lock 1209, which may be in the form of a nut to lock the arm 1109 in the desired test orientation.

The pendulum test assembly 1100 simulates an actual smart device drop event according to one or more embodiments. Incident impact energy, E and average impact force, $\vec{F}_{avg}$ are provided by the equations:

$$E = mgL\{1 - \cos\beta\}, \text{ and}$$

$$|\vec{F}_{avg}| = \frac{m\vec{v}_f - m\vec{v}_i}{\Delta t},$$

respectively. Where, m=mass of swing (arm), L=length of arm, g=acceleration of free fall, vf and vi are final and initial impact velocities, respectively, and $\Delta t$=contact interaction time. When the mass and length of the swing arm are known, setting the angle $\beta$ to a selected position, an impact force can be calculated and used to simulate impacts on a device when dropped from a specific height. For example, the average force experienced by a cover glass sheet of a 130 g mobile phone device when dropped from 1 meter height has been calculated to be 800 N. Using the mass, arm length and angle $\beta$, this force can be replicated using the pendulum test assembly and methods described herein.

The above-described pendulum test may be applied to test assemblies 2000 as described herein. Each test assembly 2000 may be subjected to a bend radius of 0.4 mm to impart an externally applied tensile stress at the apex of the test frame of 100 MPa. As described above in relation to the drop test, to determine the survivability rate of the liquid lens 100 when swung from a predetermined height, each test assembly 2000 is dropped a single time from the predetermined height or swing angle and visually (i.e., with the naked eye) examined for evidence of fracture and/or emulsification. A sample is deemed to have "survived" the pendulum test if no fracture or substantial emulsification as described above is observed after being swung. The survivability rate is determined to be the percentage of the sample population that survived the drop test. For example, if 7 samples out of a group of 10 did not fracture when swung, the survivability rate would be 70%. Liquid lenses according to the present disclosure have a survivability, or resistance to mechanical failure, of about 60% or greater, about 70% or greater, about 80% or greater, or even about 90% or greater.

Another aspect of the disclosure pertains to a method and an apparatus for testing the survivability of the liquid lens 100 when the edge of the housing (e.g., the smart device in which the liquid lens is incorporated) is impacted. The pendulum test assembly described herein simulates a failure mode that has been observed to occur in the field when a smart device is dropped on its edge on surfaces such as asphalt, sidewalk, brick, etc. The simulated failure mode includes a combination of bending and damage introduction.

Figure 15:
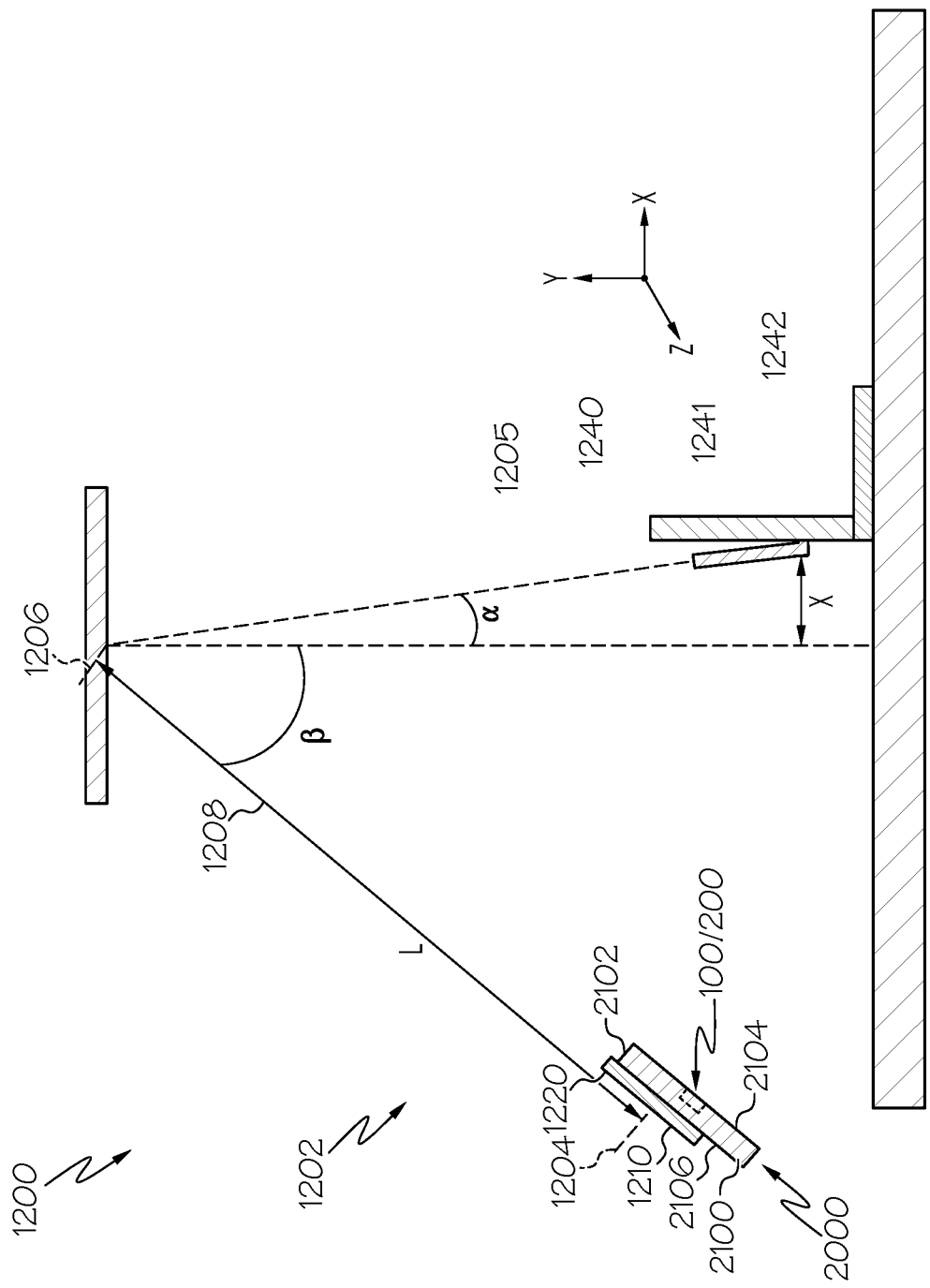
FIG. 15 depicts a side schematic view of a pendulum test assembly for contacting an edge of a test frame, according to one or more embodiments shown and described herein.
Figure 16:
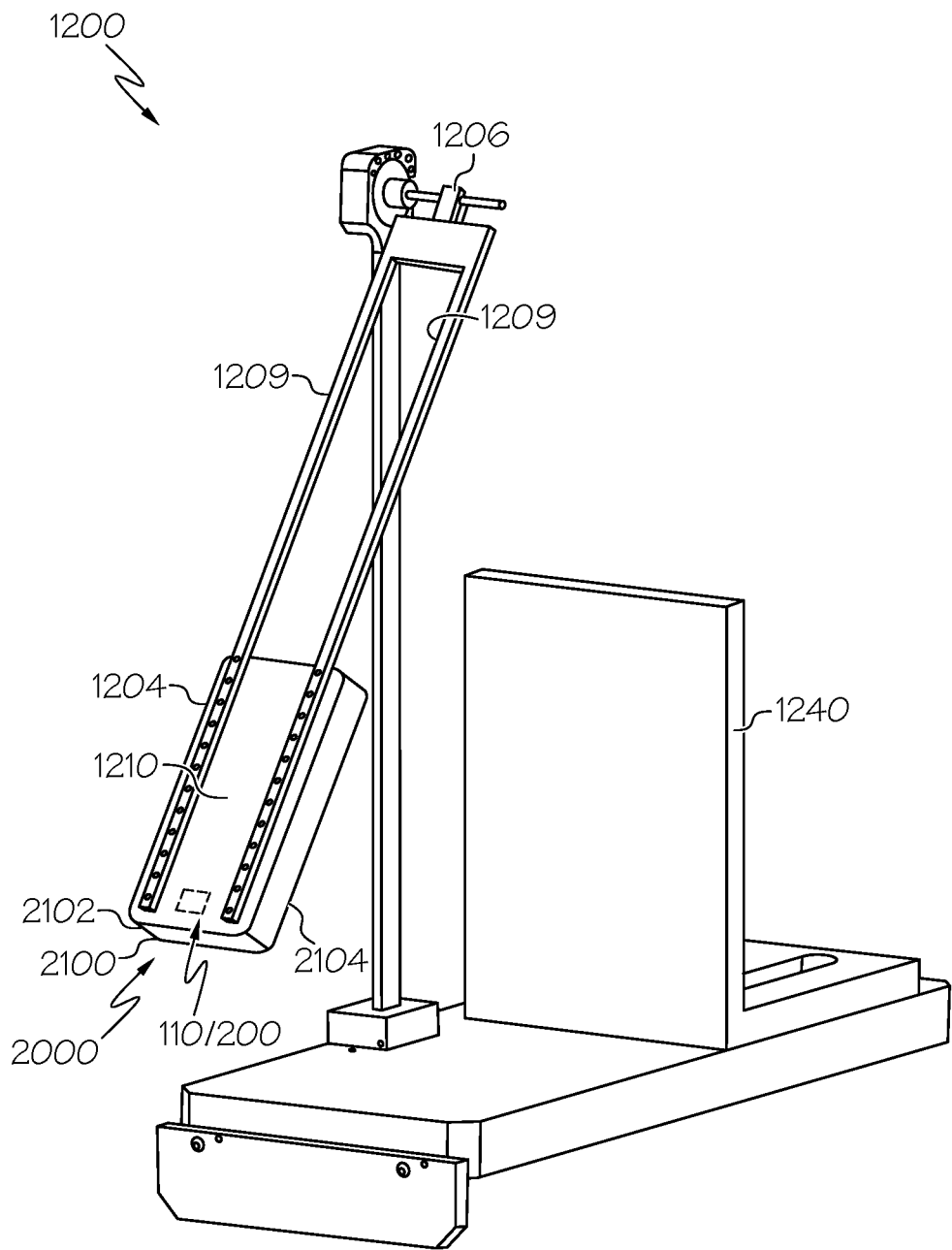
FIG. 16 is a rear perspective view of the pendulum test assembly shown in FIG. 15, according to one or more embodiments shown and described herein.

Referring now to FIGS. 15 and 16, an embodiment of a pendulum test assembly 1200 for impacting an edge of the test frame 2000 is illustrated. This embodiment of the pendulum test assembly 1200 is substantially similar to the pendulum apparatus 1100 shown and described with respect to FIGS. 9-14, with the exception of the configuration of the base and the relative position of the impacting object and the specimen. In particular, the base, the impacting object, or both are positioned such that a test assembly 2000 affixed to the bob of the pendulum will have an edge of the test frame 2100 impacted against the impacting object. The pendulum apparatus 1200 in FIGS. 15 and 16 includes a pendulum 1202 including a bob 1204 attached to a pivot 1206, the bob 1204 having an equilibrium position shown as dotted line 1205 such that the angle $\beta$ is zero. The apparatus 1200 further includes a base 1210 for receiving the test assembly 2000. The apparatus 1200 further includes a fixture 1220 to hold the specimen 1212 to the base 1210. The fixture 1220 can include clamps or any other suitable fixture device to affix the test assembly 2000 to the base 1210. The base 1210 does not necessarily include an apex of the type shown in FIG. 10. The base may include one or more fixtures. The fixture may be a clamp, such as a toggle clamp. In some embodiments, the fixture may be a bar clamp, C-clamp, or other suitable fixture to hold the ends of the test assembly 2000. In one or more embodiments, the fixture can include an adhesive, such as glue, epoxy, Velcro, or adhesive tape to adhere the test assembly 2000 to the base 1210.

The apparatus 1200 further includes an impacting object 1240 positioned such that when the bob 1204 is released from a position at an angle β greater than zero from the equilibrium position 1205, an edge of the test frame 2100 attached to the bob 1204 contacts the impacting object 1240. The bob 1204 is connected to the pivot 1206 by movable arm 1208, which may be in the form of a string, a rod, or a plurality of rods, such as the two rods 1209 shown in FIG. 15. The bob 1204 can comprise the test assembly 2000 that is affixed to the lower end of the arm 1208. In one or more embodiments, the bob 1204 includes the base 1210 and the specimen 1212.

In one or more embodiments, the impacting object 1240 is fixed and does not move when the test frame 2100 contacts the impacting object 1240. The impacting object 1240 according to one or more embodiments includes a roughened surface 1241 that contacts the edge of the test frame 2100 upon impact. This roughened surface can be in the form of a piece of concrete, brick, or granite, or an abrasive sheet, such as sandpaper, affixed to the impacting object 1240. In a specific embodiment, the roughened surface 1241 comprises an abrasive sheet having an abrasive surface positioned to be placed in contact with the edge of the specimen.

In one or more embodiments, the base 1210 is configured such that the specimen 1212 is held at an angle with respect to the arm 1208 such that the edge of the test frame 2100 contacts the impacting object 1240. In one or more embodiments, a portion of the impacting object 1240 is positioned at an angle with respect to the equilibrium position 1205 of the bob 1204 so that the edge of the test frame 2100 contacts the impacting object 1240 as shown in FIG. 15. This can be accomplished by providing an impacting object 1240 that is wedge-shaped, or the impacting object 1240 can be moved to different angular positions with respect to the equilibrium position 1205 of the bob 1204. For example, the impacting object 1240 can be mounted on a rotation point 1242, such as a hinge, so that when specimen edge 1217 contacts the impacting object 1240. The rotation point 1242 or hinge can be fixed in place by any suitable way, such as by threads and fasteners, detents, or clamps. In one or more embodiments, the impacting object 1240 can be mounted on the rotation point 1242 or hinge, for example, using clamps, adhesive or any other suitable way to fix the impacting object to the rotation point 1242 or hinge.

According to one or more embodiments, the bob 1204 can swivel clockwise and anticlockwise around the major axis of the arm, and this rotation can be locked to keep the impact orientation fixed. The impacting object 1240 can be moved back and forth to also allow flexibility of impact position/adjustment of impact energy, and to provide an angle with respect to the equilibrium position 1205 such that the edge 1217 of the specimen 1212 impacts the impacting object 1240.

Figure 17:
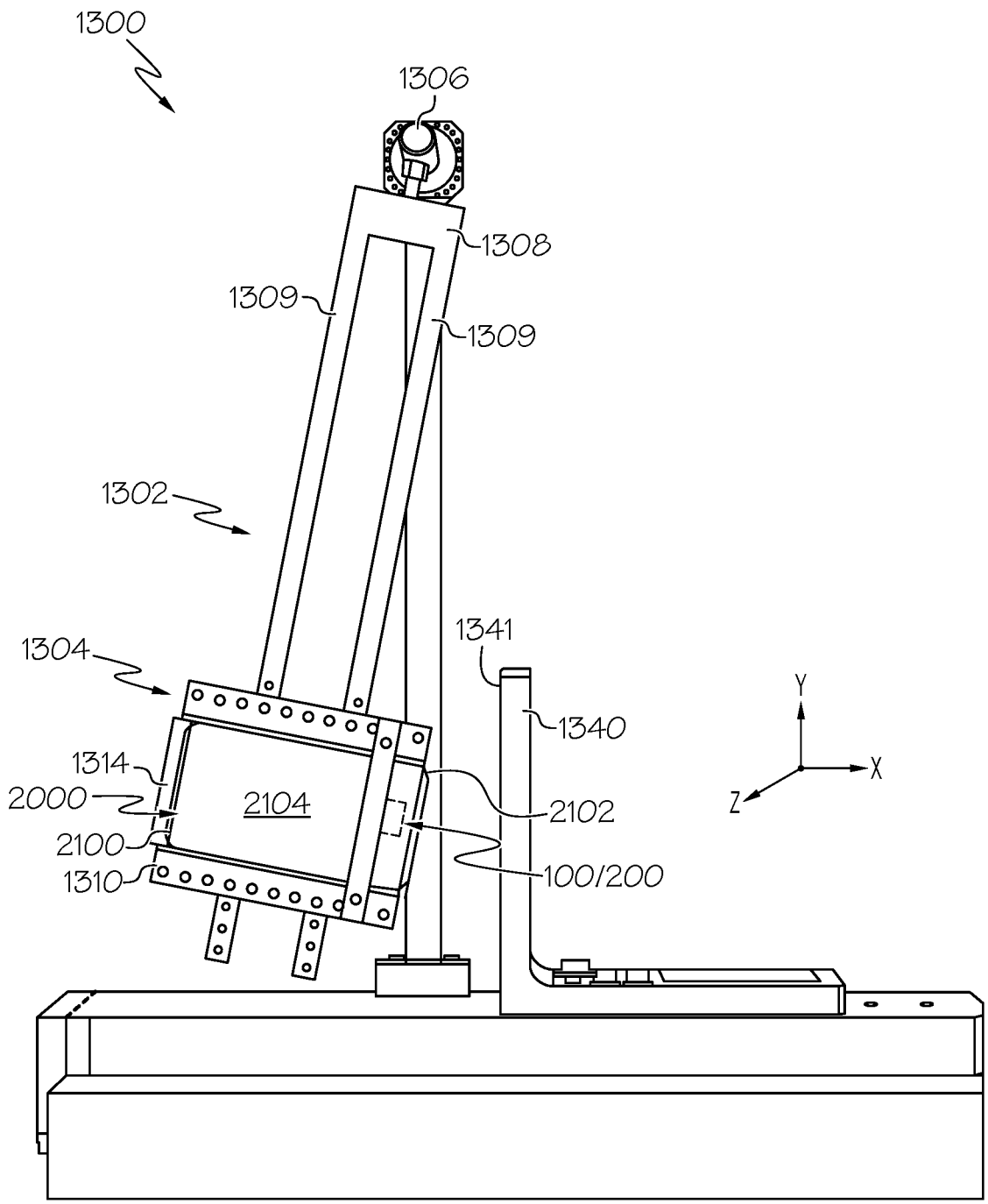
FIG. 17 is a side view of a pendulum test assembly for impacting an edge of a test frame, according to one or more embodiments shown and described herein.

FIG. 17 shows another embodiment of a pendulum test assembly 1300 for edge impact testing an edge of a specimen. The embodiment of the apparatus 1300 shown in FIG. 17 is substantially similar to the pendulum test assembly 1200 shown and described with respect to FIGS. 15 and 16, with the exception of the configuration of the base and the relative position of the impacting object and the test specimen, the position of the impacting object as described in more detail below. In particular, the base, the impacting object, or both are positioned such that a specimen affixed to the bob of the pendulum will have an edge impacted against the impacting object. The pendulum test assembly 1300 in FIG. 17 includes a pendulum 1302 including a bob 1304 attached to a pivot 1306, the bob 1304 having an equilibrium position similar to that shown in FIG. 14 such that angle β is zero. The apparatus 1300 further includes a base 1310 for receiving the test assembly 2000. The apparatus 1300 further includes a fixture 1320 to hold the test assembly 2000 to the base 1310. The fixture 1320 can include clamps or any other suitable fixture device to affix the test frame 2100 of the test assembly 2000 to the base 1310. There can be one or more fixtures, such as a clamp, and in specific embodiments toggle clamps. However, other types of fixtures such as bar clamps, C-clamps, or other suitable fixtures to hold the ends of the test frame 2100 can be used. In one or more embodiments, the fixture can include adhesive such as glue, epoxy, Velcro, or adhesive tape to adhere the test assembly 2000 to the base 1310.

Figure 18:
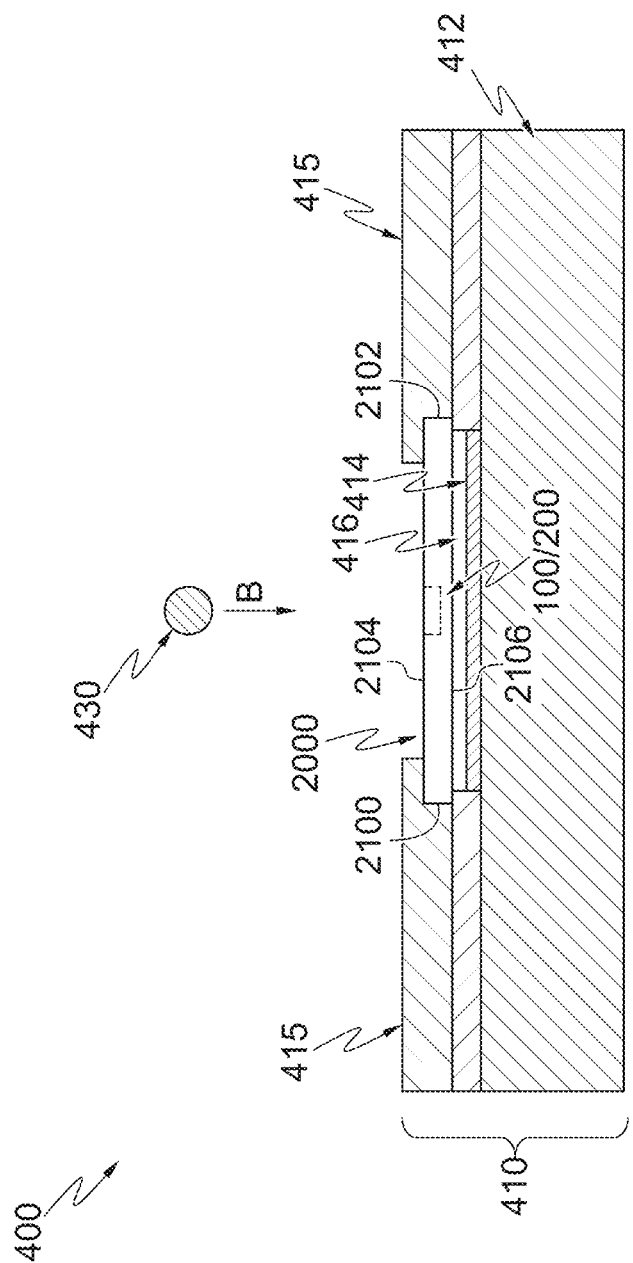
FIG. 18 depicts a ball drop test assembly, according to one or more embodiments shown and described herein.

The pendulum test assembly 1300 further includes an impacting object 1340 positioned such that when the bob 1304 is released from a position at an angle β greater than zero from the equilibrium position, the edge of the test frame 2100 attached to the bob 1304 contacts the impacting object 1340. The bob 1304 shown in FIG. 17 is connected to the pivot 1306 by movable arm 1308, which may be in the form of a string, or a rod or a plurality of rods, such as two rods 1309 as shown in FIG. 18. The bob 1304 can comprise the test assembly 2000 that is affixed to the lower end of the arm 1308. In one or more embodiments, the bob 1304 includes the base 1310 and the test assembly 2000.

In one or more embodiments, the impacting object 1340 is fixed and does not move when the test frame 2100 of the test assembly 2000 contacts the impacting object 1340. The impacting object 1340 according to one or more embodiments includes a roughened surface 1341 that contacts the edge of the test frame 2100 upon impact. This roughened surface can be in the form of a piece of concrete, brick, granite or an abrasive sheet such as sandpaper affixed to the impacting object 1340. In a specific embodiment, the roughened surface 1341 comprises an abrasive sheet having an abrasive surface positioned to be placed in contact with the edge of the test frame 2100.

In one or more embodiments, the base 1310 is configured such that the test assembly 2000 is held so that the test frame 2100 is substantially in the same plane as the two rods 1309, and the test frame 2100 is mounted in a flat relationship with the two rods 1309. In this configuration, the edge 1317 of the test frame 2100 directly contacts the impacting object 1340. Stated another way, in the embodiment shown, the plane of the front wall 2104 of test frame 2100 is perpendicular to the plane of the impacting object 1340. Thus, if the planar surface of the impacting object 1340 is in the Y-Z plane of a Cartesian coordinate system, the plane of the front wall 2104 of the test frame 210 is in the X-Y plane. In FIG. 15 the plane of the front wall 2104 of the test frame 2100 and the plane of the impacting object 1240 are in substantially the same Y-Z plane, and the impacting object can be tilted with respect to the Y-Z plane to cause edge 1217 to contact the impacting object 1240. Thus, in one or more embodiments, the impacting object 1340 defines a plane, and the fixture is configured to hold the test frame 2100 so that the plane of the front wall 2104 of the test frame 2100 and the plane of the impacting object are different, and the at least one edge contacts the impacting object when the bob is released from a position at an angle greater than zero from the equilibrium position.

According to one or more embodiments, the bob 1304 can swivel clockwise and anticlockwise and the rotation of the bob may be locked to keep impact orientation fixed. The impacting object 1340 can be moved back and forth to also allow flexibility of impact position/adjustment of impact energy, and to provide an angle with respect to the equilibrium position such that the edge 1317 of the test frame 2100 impacts the impacting object 1340.

In the embodiments described in the instant disclosure, the test assembly 2000 is mobile and the impacting object 1240 and roughened surface 1241 are stationary, which simulates the boundary condition of a substrate that has been dropped, for example, when the user of a mobile phone or electronic device drops the phone or device and it impacts the ground. The specimen impacts the impacting object, which can have an abrasive surface, with a specimen impact energy described by the equations immediately below.

$$E = mgL\{\cos\beta - \cos\alpha\}$$

$$E = mgL\left\{\cos\beta - \cos\left[\sin^{-1}\left(\frac{x}{L}\right)\right]\right\},$$

where, referring to FIG. 15, E=incident impact energy, m=mass of swing (arm), L=length of arm, and g=acceleration of free fall. The angle β and angle α are shown in FIG. 14, with angle β as the angle of the swing arm with respect to the equilibrium position 1205 and angle α as the angle of the impacting object 1240 with respect to the equilibrium position 1205, while x is the distance of the impacting object 1240 at the rotation point 1242 from the equilibrium position 1205. When the mass and length of the swing arm are known, setting the angle β to a selected position, an impact force can be calculated and used to simulate impacts on a device when dropped from a specific height. For example, the average force experienced by a substrate cover glass on a 130 g mobile phone device when dropped from 1 meter height has been calculated to be 800 N. Using the mass, arm length and angle β, this force can be replicated using the apparatus and methods described herein. In this case, energy loss (due air resistance of swing arm) is very minimal, and may be neglected.

Additional embodiments of the disclosure pertain to methods of impact testing specimens at an edge thereof. In a first embodiment, a method of impact testing an edge of a test assembly 2000 comprises affixing a test assembly 2000 having an edge to a moving arm and impacting the edge of the test assembly 2000 with an impacting object using a pendulum, for example, using the pendulum test assemblies shown in FIGS. 15-17. In one variant, the test assembly 2000 is affixed to an end of a pendulum arm to provide a pendulum bob. In some embodiments, the pendulum bob is moved such that the contact surface contacts the edge of the test frame 2100. In some embodiments, the test frame 2100 is positioned at an angle with respect to the impacting object prior to impacting the edge of the test frame 2100.

In some embodiments, an abrasive sheet is placed in contact with the impacting object prior to impacting the test frame 2100 at the edge. In some embodiments, the test frame is secured to a base at an angle to expose the edge prior to impacting the edge against the impacting object.

In another embodiment, a method of impact testing an edge of a specimen in the form of a sheet includes attaching a test assembly 2000 to a base of a pendulum bob such that an edge surface of the sheet is exposed, and moving the pendulum bob with the test assembly 2000 to cause the edge surface to contact an impacting object. In some embodiments, the method includes attaching the test assembly to the base at an angle to expose the edge of the test assembly. In some embodiments, the test assembly attached to the base is moved such that the impacting object contacts the edge. In some embodiments, the test assembly is positioned at an angle on the base prior to impacting the edge of the test frame 2100 against the impacting object. In some embodiments, an abrasive sheet is placed in contact with the impacting object prior to impacting the test frame 2100 at the edge. In some embodiments, the test frame 2100 is secured to the base to expose the edge prior to impacting the edge with the impacting object.

According to some embodiments, the swing impact on the test assembly 2000 edge simulates an impact collision between smart device edge and a hard surface that can result when a smart device is dropped. Experimental results indicate conditions relating to stress profile.

In each of the above-described pendulum tests, test assemblies 2000 as described herein may be subjected to testing at incremental swing angles (β) and impacted to the impacting object. As described above in relation to the drop test, to determine the survivability rate of the liquid lens/camera module when swung from a predetermined height, each test frame is dropped a single time from the predetermined height or swing angle and visually (i.e., with the naked eye) examined for evidence of fracture and/or emulsification. Additionally, and as noted above, optical performance may be measured and compared to a baseline optical performance to determine a survivability rate. For example, and as described above, an interface between the first liquid and the second liquid may be observed during excitation at a predetermined diopter voltage both before and after application of the pendulum test (e.g., immediately after, 10 minutes after, 15 minutes after, 30 minutes after, 1 hour after, etc.). The desired diopter voltage (e.g., to achieve a 2 diopter) may be applied and the shape compared to a shape of the interface prior to application of the pendulum test to determine a percentage of change in optical performance. A sample is deemed to have "survived" the pendulum test if no fracture or substantial emulsification is observed after being swung and the optical performance is substantially maintained (e.g., 80% optical performance maintained, 90% optical performance maintained, 95% optical performance maintained, 99% optical performance maintained). The survivability rate is determined to be the percentage of the sample population that survived the drop test. For example, if 7 samples out of a group of 10 did not fracture/substantially emulsify, or have substantially reduced optical performance when swung, the survivability rate would be 70%. Liquid lenses according to the present disclosure have a survivability, or resistance to mechanical failure, of about 60% or greater, about 70% or greater, about 80% or greater, about 90% or greater.

The Ball Drop Test

Ball drop tests are often used in testing the performance of glass articles. A ball drop test is fully described in U.S. Pat. No. 9,902,648, entitled "Strengthened Glass with Deep Depth of Compression," hereby incorporated by reference in its entirety. It is noted that the glass sheets tested in U.S. Pat.

No. 9,902,648 may be exchanged for the testing assembly 2000 described above, and the test then performed as described.

A ball drop test is schematically illustrated in FIG. 18. In general, ball drop tests include dropping a ball 430 in a direction B onto a surface of the test frame 2100 of the test assembly 2000. The forces from the dropped ball 230 may be transferred through the test frame 2100 to the liquid lens 100/camera module 200 contained therein. The ball drop test assembly 400 includes a test stand 410 and the ball 430. Ball 430 is a rigid or solid ball such as, for example, a stainless steel ball, or the like. In one embodiment, ball 430 is a 4.2 gram stainless steel ball having diameter of 10 mm. The ball 430 is dropped directly onto a surface (e.g., the front wall 2104 or the back wall 2106 of the test frame 2100) from a predetermined height h. Test stand 410 includes a solid base 412 comprising a hard, rigid material such as granite or the like. A sheet 414 having an abrasive material disposed on a surface is placed on the upper surface of the solid base 412 such that surface with the abrasive material faces upward. In some embodiments, sheet 414 is sandpaper having a 30 grit surface and, in other embodiments, a 180 grit surface. The test frame 2000 is held in place above sheet 414 by sample holder 415 such that an air gap 416 exists between the test frame 2100 and sheet 214. The air gap 416 between sheet 214 and test frame 2100 allows test frame 2100 to bend upon impact by ball 430 and onto the abrasive surface of sheet 414. In one embodiment, the test frame 2100 is clamped across all corners to keep bending contained only to the point of ball impact and to ensure repeatability. The air gap 416 is in a range from about 50 μm to about 100 μm. An adhesive tape may be used to cover the upper surface of the test frame to collect fragments in the event of fracture of test frame 2100 upon impact of ball 430.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

In one aspect, a method 300 of conducting the ball drop test using the apparatus 400 described hereinabove is shown in FIG. 18. The method includes placing the test frame 2100 with the liquid lens 100 and/or camera module 200 in the test stand 410. The test frame 2100 may be placed in the test stand 410 and secured in sample holder 415 such that the air gap 416 is formed between the glass test frame 2100 and sheet 414 with an abrasive surface. In some embodiments, however, the method may include placing sheet 414 in test stand 410 such that the surface with abrasive material faces upward. In some embodiments, an adhesive tape is applied to the upper surface of the test frame 2100 prior to securing the test assembly 2000 in the sample holder 410.

The method further includes dropping a solid ball 430 of predetermined mass and size from a predetermined height h in a direction B onto the upper surface (e.g., front wall 2104) of the test frame 2100, such that the ball 430 impacts the upper surface (or adhesive tape affixed to the upper surface) at approximately the center (i.e., within 1 mm, or within 3 mm, or within 5 mm, or within 10 mm of the center) of the upper surface (see FIG. 18). Following impact, the extent of damage to the liquid lens is determined. That is, the liquid lens is visually inspected for fracture and/or substantial emulsification.

The sheet 418 with the abrasive surface may be replaced after each drop to avoid "aging" effects that have been observed in repeated use of other types (e.g., concrete or asphalt) of drop test surfaces.

Various predetermined drop heights h and increments are typically used in performing the ball drop test. The test may, for example, utilize a minimum drop height to start (e.g., about 10-20 cm). The height may then be increased for successive drops by either a set increment (e.g., 5, 10, or 20 cm increments) or variable increments. The test is stopped once the liquid lens fractures or substantially emulsifies. Alternatively, if the drop height h reaches the maximum drop height (e.g., about 100 cm) without fracture or substantial emulsification, the ball drop test of may be stopped, or the ball drop test may continue to be repeated at the maximum height until fracture or substantial emulsification occurs.

In some embodiments, ball drop test is performed only once on each test assembly at each predetermined height h. In other embodiments, however, each test assembly may be subjected to multiple tests at each height.

As described above in relation to the drop test, to determine the survivability rate of the liquid lens/camera module during the ball drop test, a ball is dropped a single time from the predetermined height and visually (i.e., with the naked eye) examined for evidence of fracture and/or emulsification. Additionally, optical performance may be measured and compared to a baseline optical performance as described above. For example, the shape of the interface of the liquid lens may be observed upon application of the known diopter voltage both pre- and post-ball drop test (e.g., immediately after, 10 minutes after, 15 minutes after, 30 minutes after, 1 hour after, etc.). The diopter voltage configured to achieve a certain diopter (e.g., 2 diopter) may be applied and the shape compared to a shape of the interface prior to application of the drop test to determine a percentage of change in optical performance. A sample is deemed to have "survived" the ball drop test if no fracture or substantial emulsification is detected and/or if optical performance is substantially maintained (e.g., 80% optical performance maintained, 90% optical performance maintained, 95% optical performance maintained, 99% optical performance maintained). The survivability rate may be determined as the percentage of the sample population that survives the ball drop test. For example, if 7 samples out of a group of 10 did not fracture/substantially emulsify, or have substantially reduced optical performance upon impact, the survivability rate would be 70%. Liquid lenses according to the present disclosure have a survivability, or resistance to mechanical failure, of about 60% or greater, about 70% or greater, about 80% or greater, about 90% or greater.

EXAMPLE

Figure 19:
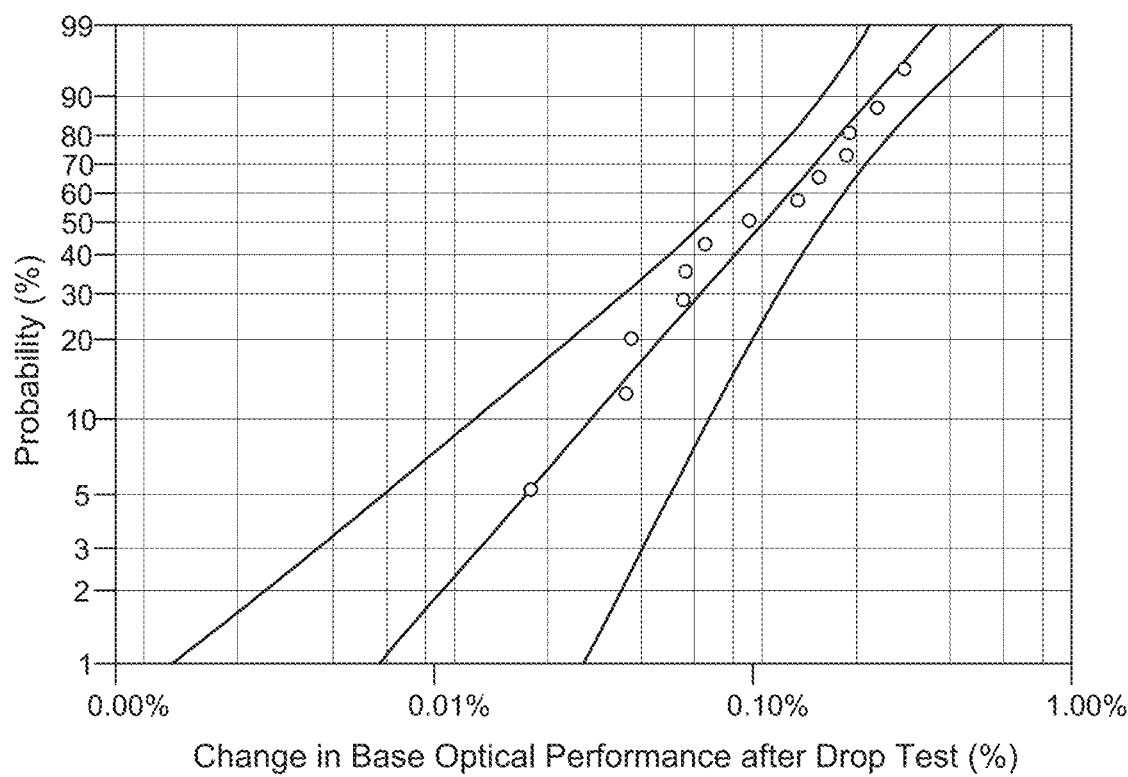
FIG. 19 depicts a probability plot of percent change in a base optical performance of a liquid lens, according to one or more embodiments shown an described herein.

In one example, a drop test as described herein was performed on 13 liquid lenses. Each of the 13 liquid lenses was energized at a diopter voltage to achieve 2 diopter and the shape of the interface between the first liquid and the second liquid was measured to determine a base-line optical performance for each liquid lens. Thereafter, the drop test as described herein above was performed on each of the liquid lenses. That is, the liquid lenses were individually mounted into a test frame, which was mounted to a test stand for the drop test, as described above. The test frame with the liquid lens mounted therein was dropped from a drop height of about 2.2 m. After the drop test, the liquid lenses were observed for fracture or substantial emulsification. In this test, none of the liquid lenses as described herein experienced fracture or visible emulsification. The liquid lenses were then subjected to the same diopter voltage as before the drop test at about one hour post-drop test to determine the optical performance of the liquid lenses following the drop test. The results are illustrated in FIG. 19 in a Weibull probability plot with the vertical axis being percent probability and the horizontal axis being percent change. As shown, each of the liquid lenses experienced less than 1% change to their base optical performance. That is, the shape of the interface when energized to the known diopter voltage changed less than 1% when compared to the pre-drop shape. Accordingly, a survivability rating of the test sample was determined to be 99% following drop test.

In view of the above, it should now be understood the embodiments of the present disclosure are directed to testing assemblies for liquid lenses. Such testing assemblies allow for improved determination of survivability of liquid lenses in a variety of impact scenarios. Moreover, the present disclosure is directed to liquid lenses that have high survivability in view of the above-described drop tests.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A testing assembly for conducting reliability tests on liquid lenses, the testing assembly comprising:
    a liquid lens comprising:
        a lens body defining a cavity;
        a first liquid disposed within the cavity; and
        a second liquid disposed within the cavity that is substantially immiscible with the first liquid such that an interface between the first liquid and the second liquid forms a lens; and
    a test frame arranged to receive the liquid lens, the test frame comprising:
        a front wall; and
        a back wall oriented substantially parallel to the front wall, wherein:
        the liquid lens mounts to at least one of the front wall or the back wall; and
        the test frame simulates a smart device incorporating a liquid lens.

2. The testing assembly of claim 1, wherein the testing assembly comprises a test stand arranged to facilitate performance of an impact test comprising a drop test, a pendulum test, or a ball drop test.

3. The testing assembly of claim 2, wherein the test frame is arranged to be mounted to the test stand.

4. The testing assembly of claim 2, wherein the test stand comprises jaws arranged to assemble the test frame to the test stand.

5. The testing assembly of claim 4, wherein the jaws are adjustable relative to a horizontal axis to adjust a drop angle of the test frame.

6. The testing assembly of claim 1, further comprising an impact surface, wherein the test frame impacts the impact surface during a reliability test.

7. The testing assembly of claim 1, wherein the liquid lens is mounted within a camera module.

8. A method for conducting reliability tests on liquid lenses, the method comprising:
    mounting a liquid lens within a test frame, the test frame comprising a front wall, a back wall oriented substantially parallel to the front wall, wherein the test frame simulates a smart device incorporating a liquid lens; and
    performing an impact test comprising at least one of a drop test, a pendulum test, or a ball drop test on the liquid lens and the test frame,
    wherein performing the impact test comprises:
        mounting the test frame to a test stand;
        positioning the test frame at a predetermined height with the test stand; and
        dropping the test frame with the liquid lens mounted therein from the predetermined height.

9. The method of claim 8, further comprising adjusting a drop angle of the test frame with the test stand.

10. The method of claim 8, further comprising applying a bending moment to the test frame, wherein the bending moment is maintained throughout the impact test.

11. The method of claim 8, further comprising determining a reliability of the liquid lens by one of:
    detecting emulsification of the liquid lens;
    detecting a fracture of the liquid lens;
    determining a change in optical performance of the liquid lens; or
    any combinations thereof.

12. The method of claim 11, wherein determining the change in optical performance of the liquid lens comprises:
    energizing the liquid lens to a known diopter voltage; and
    comparing a shape of the liquid lens to a pre-dropped shape of the liquid lens energized to the same known diopter voltage.

13. A liquid lens comprising:
    a lens body defining a cavity;
    a first liquid disposed within the cavity; and
    a second liquid disposed within the cavity that is substantially immiscible with the first liquid such that an interface between the first liquid and the second liquid forms a lens, wherein the liquid lens comprises a survivability rate of at least 60% as determined with a drop test, a pendulum test, or a ball drop test,
    wherein the liquid lens comprises a change in optical performance of less than 1% after application of the drop test.

14. The liquid lens of claim 13, wherein the survivability rate is at least 90% using the drop test.

15. The liquid lens of claim 13, wherein the lens body is arranged to be assembled in a camera module.

16. The liquid lens of claim 13, wherein the cavity comprises:
    a headspace; and
    a base portion defined by a bore, wherein the second liquid is disposed in the base portion and the first liquid is disposed in the headspace.

17. The liquid lens of claim 13, further comprising:
a first outer layer defining a first window;
an intermediate layer defining the cavity; and
a second outer layer defining a second window, wherein the intermediate layer is positioned between the first outer layer and the second outer layer.

18. The liquid lens of claim 13, wherein the first liquid and the second liquid comprise substantially the same density.

* * * * *